US012433810B2

(12) United States Patent
Shao et al.

(10) Patent No.: US 12,433,810 B2
(45) Date of Patent: Oct. 7, 2025

(54) MOTION PLATFORMS, MEDICAL BEDS, AND MEDICAL DEVICES

(71) Applicant: SHANGHAI UNITED IMAGING HEALTHCARE CO., LTD., Shanghai (CN)

(72) Inventors: Yuelin Shao, Shanghai (CN); Xiaobin Li, Shanghai (CN); Song Chen, Shanghai (CN); Xiangmeng Fan, Shanghai (CN); Chao Gao, Shanghai (CN); Jianxiong Zou, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 162 days.

(21) Appl. No.: 18/497,982

(22) Filed: Oct. 30, 2023

(65) Prior Publication Data

US 2024/0058194 A1 Feb. 22, 2024

Related U.S. Application Data

(63) Continuation-in-part of application No. PCT/CN2022/088992, filed on Apr. 25, 2022.

(30) Foreign Application Priority Data

Apr. 30, 2021 (CN) ......................... 202110482581.7
Dec. 30, 2022 (CN) ......................... 202211731710.2

(51) Int. Cl.
*A61G 13/04* (2006.01)
*A61G 13/12* (2006.01)

(52) U.S. Cl.
CPC ......... *A61G 13/04* (2013.01); *A61G 13/1295* (2013.01)

(58) Field of Classification Search
CPC ........................................................ A61B 6/04
See application file for complete search history.

(56) References Cited

U.S. PATENT DOCUMENTS

| | | | | |
|---|---|---|---|---|
| 10,172,750 B1 | | 1/2019 | Dickie | |
| 2014/0033432 A1 | * | 2/2014 | Marle | A61B 6/0487 5/601 |

FOREIGN PATENT DOCUMENTS

| | | | |
|---|---|---|---|
| CN | 201481694 U | 5/2010 | |
| CN | 102179807 A | 9/2011 | |

(Continued)

OTHER PUBLICATIONS

International Search Report in PCT/CN2022/088992 mailed on Jun. 28, 2022, 4 pages.

(Continued)

*Primary Examiner* — Adam C Ortiz
(74) *Attorney, Agent, or Firm* — METIS IP LLC

(57) ABSTRACT

A motion platform, a medical bed, and a medical device are provided. The motion platform may include a moveable plate, a first driving mechanism, a second driving mechanism, and a fulcrum mechanism. The first driving mechanism and the second driving mechanism may be connected to the moveable plate at a first support point and a second support point, respectively. The fulcrum mechanism may be connected to the moveable plate at a third support point. The first support point, the second support point, and the third support point may be non-collinear. The first driving mechanism and the second driving mechanism may be configured to cause the moveable plate to move in at least two degrees of freedom relative to the third support point.

19 Claims, 17 Drawing Sheets

(56) References Cited

FOREIGN PATENT DOCUMENTS

| | | | |
|---|---|---|---|
| CN | 103263276 | A | 8/2013 |
| CN | 103750968 | A | 4/2014 |
| CN | 105818116 | A | 8/2016 |
| CN | 106798617 | A | 6/2017 |
| CN | 207448460 | U | 6/2018 |
| CN | 109876311 | A | 6/2019 |
| CN | 110539293 | A | 12/2019 |
| CN | 210096699 | U | 2/2020 |
| CN | 111358485 | A | 7/2020 |
| CN | 111604885 | A | 9/2020 |
| CN | 112603686 | A | 4/2021 |
| WO | 2017092105 | A1 | 6/2017 |
| WO | 2022228388 | A1 | 11/2022 |

OTHER PUBLICATIONS

Written Opinion in PCT/CN2022/088992 mailed on Jun. 28, 2022, 5 pages.

The Extended European Search Report in European Application No. 22794858.5 mailed on Jul. 5, 2024, 7 pages.

* cited by examiner

900

MOTION PLATFORMS, MEDICAL BEDS, AND MEDICAL DEVICES

CROSS-REFERENCE TO RELATED APPLICATIONS

This application claims priority to Chinese Patent Application No. 202211731710.2, filed on Dec. 30, 2022, and is a Continuation-in-part of International Application No. PCT/CN2022/088992 filed on Apr. 25, 2022, which claims priority to Chinese Patent Application No. 202110482581.7, filed on Apr. 30, 2021, the contents of each of which are incorporated herein by reference in their entirety.

TECHNICAL FIELD

The present disclosure relates to the field of medical instruments, and more particularly, relates to motion platforms, medical beds, and medical devices.

BACKGROUND

During a process of treatment and/or imaging with a medical device, it is necessary to accurately position a specific portion of a patient. For example, during a process of radiotherapy, it is necessary to accurately position a tumor location of a radiotherapy object. At present, the tumor location of the radiotherapy object is usually accurately positioned by moving a radiotherapy bed. Therefore, a motion platform needs to be disposed in the radiotherapy bed to drive the radiotherapy bed to move through the motion platform. However, the motion accuracy of the motion platform may be low, so as to position the tumor location inaccurately. Therefore, it is desirable to provide motion platforms with high accuracy.

SUMMARY

One aspect of the present disclosure may provide a motion platform. The motion platform may include a moveable plate, a first driving mechanism, a second driving mechanism, and a fulcrum mechanism. The first driving mechanism and the second driving mechanism may be connected to the moveable plate at a first support point and a second support point, respectively, and the fulcrum mechanism may be connected to the moveable plate at a third support point. The first support point, the second support point, and the third support point are non-collinear. The first driving mechanism and the second driving mechanism may be configured to cause the moveable plate to move in at least two degrees of freedom relative to the third support point.

In some embodiments, the first driving mechanism and/or the second driving mechanism may include a rotation driving unit and a power conversion unit. The power conversion unit may be configured to convert a rotational motion of the rotation driving unit into a movement of a corresponding support point.

In some embodiments, the rotation driving unit may include a rotation motor, and the power conversion unit may include a rocker. An end of the rocker may be rotationally connected to an output end of the rotation motor, and another end of the rocker may be rotationally connected to the moveable plate.

In some embodiments, the power conversion unit may further include a reducer. The reducer may be disposed at the output end of the rotation motor, and the rocker may be connected to the output end of the rotation motor through the reducer.

In some embodiments, both ends of the rocker may be disposed with joint bearings. The both ends of the rocker may be rotationally connected to the output end of the rotation motor and the moveable plate through the corresponding joint bearings, respectively.

In some embodiments, the first driving mechanism and/or the second driving mechanism may include linear driving units.

In some embodiments, the fulcrum mechanism may include a first rotation unit and a second rotation unit. An angle between a rotation shaft of the first rotation unit and a rotation shaft of the second rotation unit may be within a range of 85 degrees to 90 degrees.

In some embodiments, a relative position between the rotation shaft of the first rotation unit and the rotation shaft of the second rotation unit may remain.

In some embodiments, the motion platform may further include a base plate. The first driving mechanism, the second driving mechanism, and the fulcrum mechanism may be disposed on the base plate. The first rotation unit may be connected to the base plate, the second rotation unit may be connected to the moveable plate, and the moveable plate may rotate relative to the base plate through the first rotation unit and/or the second rotation unit.

In some embodiments, the first rotation unit may include a first rotation shaft and a first bearing seat. The first bearing seat may be configured to connect the first rotation shaft to the base plate. The second rotation unit may include a second rotation shaft and a second bearing seat. The second bearing seat may be configured to connect the second rotation shaft to the moveable plate. The fulcrum mechanism may include a fixed seat. The first rotation shaft and the second rotation shaft may be disposed on the fixed seat. An axis of the first rotation shaft may intersect with an axis of the second rotation shaft.

In some embodiments, the first rotation unit may include a first rotation shaft and a first bearing seat. The first bearing seat may be configured to connect the first rotation shaft to the base plate. The second rotation unit may include a second rotation shaft and a second bearing seat. The second bearing seat may be configured to connect the second rotation shaft to the moveable plate. The first rotation shaft and the second rotation shaft may form an integral cross rotation shaft part.

In some embodiments, the second bearing seat may be connected to the moveable plate through a connecting plate. The third support point may be a center point of a contact surface between the connecting plate and the moveable plate.

In some embodiments, an encoder may be disposed on the rotation shaft of the first rotation unit and/or the rotation shaft of the second rotation unit. The encoder may be configured to detect a rotation angle of a corresponding rotation shaft.

In some embodiments, the fulcrum mechanism may include a third rotation unit. An angle between a rotation shaft of the third rotation unit and the rotation shaft of the first rotation unit may be within a range of 85 degrees to 90 degrees, and an angle between the rotation shaft of the third rotation unit and the rotation shaft of the second rotation unit may be within a range of 85 degrees to 90 degrees.

In some embodiments, the motion platform may further include a third driving mechanism configured to cause the moveable plate to move relative to the rotation shaft of the third rotation unit.

In some embodiments, a ratio of a distance from the first support point to the third support point and a distance from the second support point to the third support point may be within a range of 0.9 to 1.1.

In some embodiments, the first support point and the second support point may be close to one side of the moveable plate, and the third support point may be close to another side of the moveable plate. The one side may be opposite to the another side.

Another aspect of the present disclosure may provide a medical bed. The medical bed may include the motion platform according to the above embodiments, and a bed plate. The moveable plate of the motion platform may be configured to fix and support the bed plate so as to drive the bed plate to move.

In some embodiments, the medical bed may include at least one of a radiotherapy bed, a scanning bed, or a catheter bed.

In some embodiments, the first driving mechanism and the second driving mechanism may be disposed at intervals along a width direction of the medical bed.

Another aspect of the present disclosure may provide a medical device. The medical device may include the medical bed according to the above embodiments.

In some embodiments, the medical device may further include a processor configured to cause the first driving mechanism and/or the second driving mechanism to move so as to cause the medical bed to move.

Another aspect of the present disclosure may provide a motion platform. The motion platform may include a moveable plate, a base plate, a fulcrum mechanism disposed on the base plate, and at least two driving mechanisms. A bottom surface of the moveable plate may include at least three non-collinear support points. The fulcrum mechanism and each of the at least two driving mechanisms may be respectively located on one of the support points and connected to the moveable plate. When the driving mechanism independently drives a corresponding support point to move, the moveable plate may be tilted, and the fulcrum mechanism may provide a rotational degree of freedom for the moveable plate along a tilt direction of the moveable plate.

In some embodiments, the driving mechanism may include a rotation driving unit and a power conversion unit. The power conversion unit may convert a rotational motion of the rotation driving unit into a movement of a corresponding support point.

In some embodiments, the rotation driving unit may include a rotation motor, and the power conversion unit may include a rocker. An end of the rocker may be rotationally connected to an output end of the rotating motor, and another end of the rocker may be rotationally connected to the moveable plate.

In some embodiments, the power conversion unit may further include a reducer. The reducer may be disposed at the output end of the rotation motor, and the rocker may be connected to the output end of the rotation motor through the reducer.

In some embodiments, both ends of the rocker may be disposed with joint bearings. The both ends of the rocker may be rotationally connected to the output end of the rotation motor and the moveable plate through the corresponding joint bearings, respectively.

In some embodiments, each of the at least two driving mechanisms may include a linear driving unit.

In some embodiments, the fulcrum mechanism may include a first rotation unit and a second rotation unit. A rotation shaft of the second rotation unit may be perpendicular to a rotation shaft of the second rotation unit. A relative position between the rotation shaft of the first rotation unit and the rotation shaft of the second rotation unit may remain. The first rotation unit may be connected to the base plate, and the second rotation unit may be connected to the moveable plate. The moveable plate may rotate through the first rotation unit or the second rotation unit.

In some embodiments, the first rotation unit may include a first rotation shaft and a first bearing seat. The first bearing seat may be configured to connect the first rotation shaft to the base plate. The second rotating unit may include a second rotation shaft and a second bearing seat. The second bearing seat may be configured to connect the second rotation shaft to the moveable plate. The fulcrum mechanism may include a fixed seat. The first rotation shaft and the second rotation shaft may be arranged on the fixed seat. An axis of the first rotation shaft may intersect with an axis of the second rotation shaft.

Another aspect of the present disclosure may provide a radiotherapy bed. The radiotherapy bed may include the moveable platform according to the above embodiments. The moveable plate of the motion platform may be configured to fix and support the radiotherapy bed so as to drive the radiotherapy bed to move.

Another aspect of the present disclosure may provide a medical device. The medical device may include a radiotherapy bed, and the motion platform according to the above embodiments. The moveable plate of the motion platform may be configured to fix and support the radiotherapy bed so as to drive the radiotherapy bed to move.

Another aspect of the present disclosure may provide a radiotherapy bed. The radiotherapy bed may include a bed plate and a motion platform. The bed plate may extend along an X-axis and a Y-axis. The motion platform may include a moveable plate, a base plate, a fulcrum mechanism, and two driving mechanisms. The bed plate may be supported by the moveable plate, and the fulcrum mechanism and the two driving mechanisms may be disposed on the base plate. The fulcrum mechanism and the two driving mechanisms may be respectively connected to the moveable plate. The two driving mechanisms may be disposed at intervals along the Y-axis. The two driving mechanisms and the fulcrum mechanism may be disposed at intervals along the X-axis. One or two of the two driving mechanisms may drive the moveable plate to tilt relative to the Y-axis or the X-axis. The fulcrum mechanism may provide a rotational degree of freedom for the moveable plate along a tilt direction of the moveable plate.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Numerals of the figures are as follows.

Figure 1A:
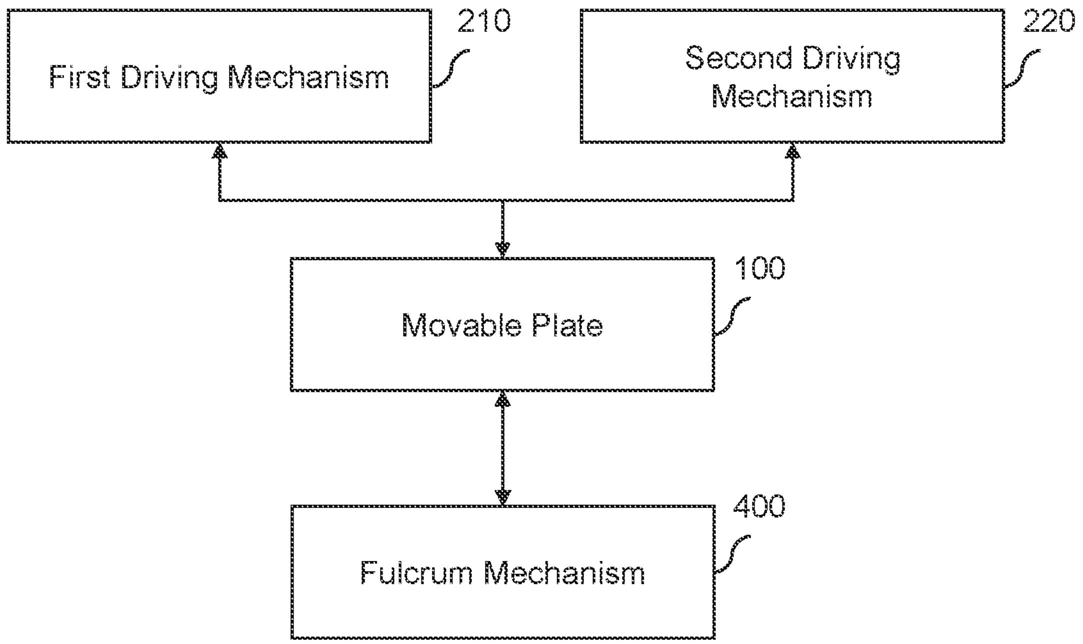
FIG. 1A is a block diagram illustrating an exemplary motion platform according to some embodiments of the present disclosure.

- 100 represents a moveable plate, and 110 represents an uplift portion.
- 210 represents a first driving mechanism, 211 represents a first rocker, 2111 represents a joint bearing, 212 represents a first reducer, 213 represents a first rotation motor, 220 represents a second driving mechanism, 221 represents a second rocker, 222 represents a second reducer, and 223 represents a second rotation motor.
- 300 represents a base plate.
- 400 represents a fulcrum mechanism, 410 represents a first rotation shaft, 420 represents a first bearing seat, 430 represents a fixed seat, 431 represents a connecting plate, 440 represents a second rotation shaft, and 450 represents a second bearing seat.
- 510 represents a first support point, 520 represents a second support point, and 530 represents a third support point.
- 600 represents a control device, 610 represents a processor, and 620 represents an encoder.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms “a,” “an,” and “the” may be intended to include the plural forms as well, unless the context clearly indicates otherwise. It will be further understood that the terms “comprise,” “comprises,” and/or “comprising,” “include,” “includes,” and/or “including,” when used in this specification, specify the presence of stated features, integers, steps, operations, elements, and/or components, but do not preclude the presence or addition of one or more other features, integers, steps, operations, elements, components, and/or groups thereof.

According to some embodiments of the present disclosure, a motion platform is provided. The motion platform may be used to solve the problem of low motion accuracy of current motion platforms. The motion platform may include a moveable plate, a first driving mechanism, a second driving mechanism, and a fulcrum mechanism. In the motion platform provided by some embodiments of the present disclosure, at least three non-collinear support points may be disposed on a bottom surface of the moveable plate. Each of the fulcrum mechanism, the first driving mechanism, and the second driving mechanism may be disposed on one support point, and connected to the moveable plate. When the first driving mechanism or the second driving mechanism independently drives a corresponding support point to move, the moveable plate may be tilted. Since the fulcrum mechanism provides a rotational degree of freedom for the moveable plate along a tilt direction of the moveable plate, the motion accuracy of the motion platform may be improved.

Figure 1B:
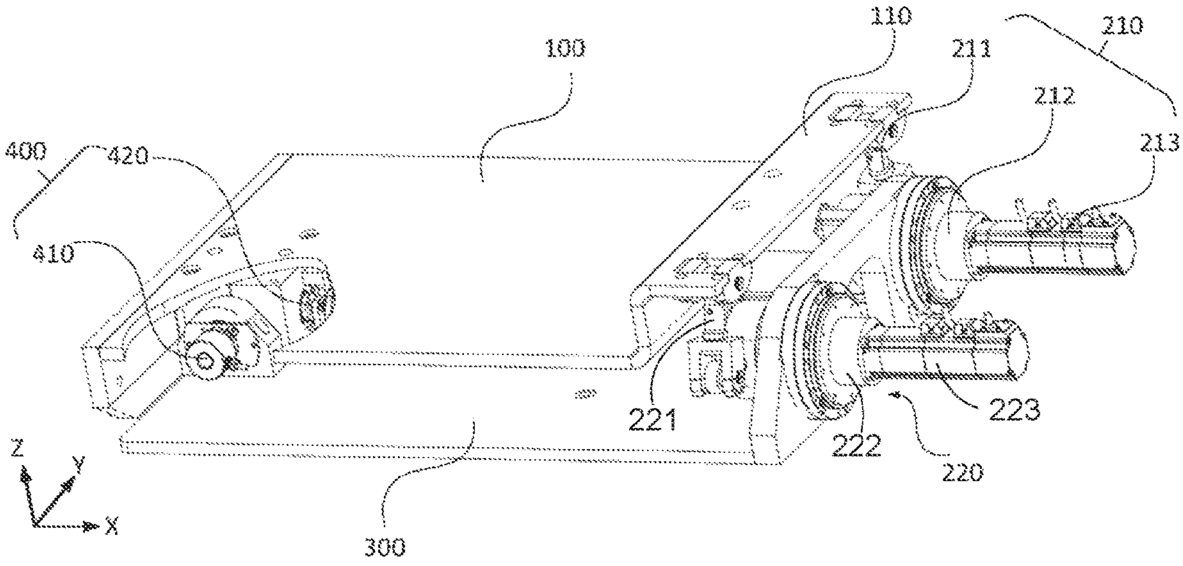
FIG. 1B is a block diagram illustrating an exemplary motion platform according to some embodiments of the present disclosure.

FIG. 1A is a block diagram illustrating an exemplary motion platform according to some embodiments of the present disclosure. FIG. 1B is a block diagram illustrating an exemplary motion platform according to some embodiments of the present disclosure.

As shown in FIG. 1A and FIG. 1B, a moving platform may include a moveable plate 100, a base plate 300, a fulcrum mechanism 400, and at least two driving mechanisms (e.g., a first driving mechanism 210 and a second driving mechanism 220). The fulcrum mechanism 400 may be disposed on the base plate 300, and the at least two driving mechanisms may be further disposed on the base plate 300. A bottom surface of the moveable plate 100 may include at least three non-collinear support points. One of the fulcrum mechanism 400 and the at least two driving mechanisms may be located on one of the support points and connected to the moveable plate 100. When one or more of the at least two driving mechanisms drive one or more of corresponding support points to move independently or jointly, the moveable plate 100 may be tilted, and the fulcrum mechanism 400 may provide a rotational degree of freedom for the moveable plate 100 along a tilt direction of the moveable plate 100. In some embodiments, the tilt direction of the moveable plate 100 may include a direction around an X-axis and/or a direction around a Y-axis. In some embodiments, the fulcrum mechanism 400 may provide the rotational degree of freedom for the moveable plate 100 only along the tilt direction of the moveable plate 100.

In some embodiments, the motion platform may include no base plate 300. That is, the motion platform may include the moveable plate 100, the fulcrum mechanism 400, and the at least two driving mechanisms (e.g., the first driving mechanism 210 and the second driving mechanism 220). The bottom surface of the moveable plate 100 may include the at least three non-collinear support points. One of the fulcrum mechanism 400 and the at least two driving mechanisms may be located on one of the support points and connected to the moveable plate 100. The at least two driving mechanisms may drive the moveable plate 100 to rotate. In some embodiments, the motion platform (e.g., the fulcrum mechanism 400 and the at least two driving mechanisms) may be directly disposed on a structure, for example, an operation table, a gantry of a hospital bed, etc. In some embodiments, the motion platform (e.g., the fulcrum mechanism 400 and the at least two driving mechanisms) may be disposed on the base plate 300. The base plate 300 may be disposed on the structure, for example, the operation table, the gantry of the hospital bed, etc.

Figure 2A:
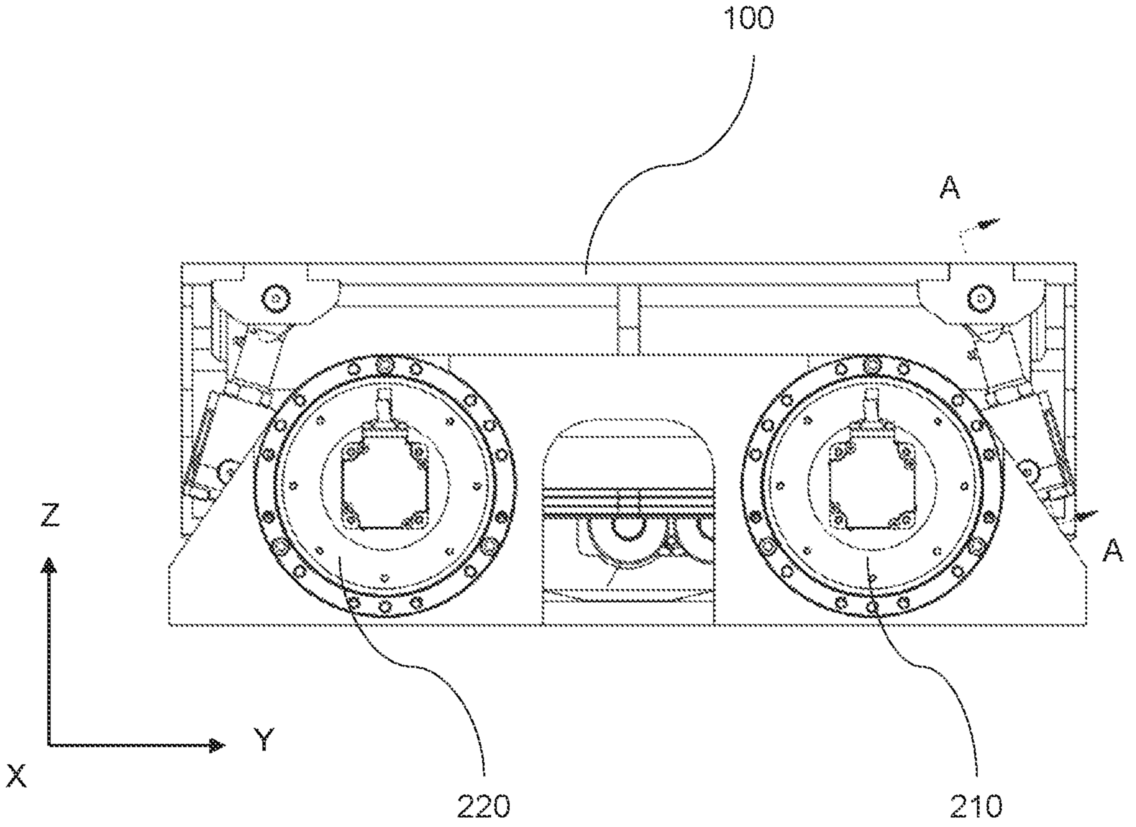
FIG. 2A is a front view illustrating a first state of a motion platform according to some embodiments of the present disclosure.
Figure 2B:
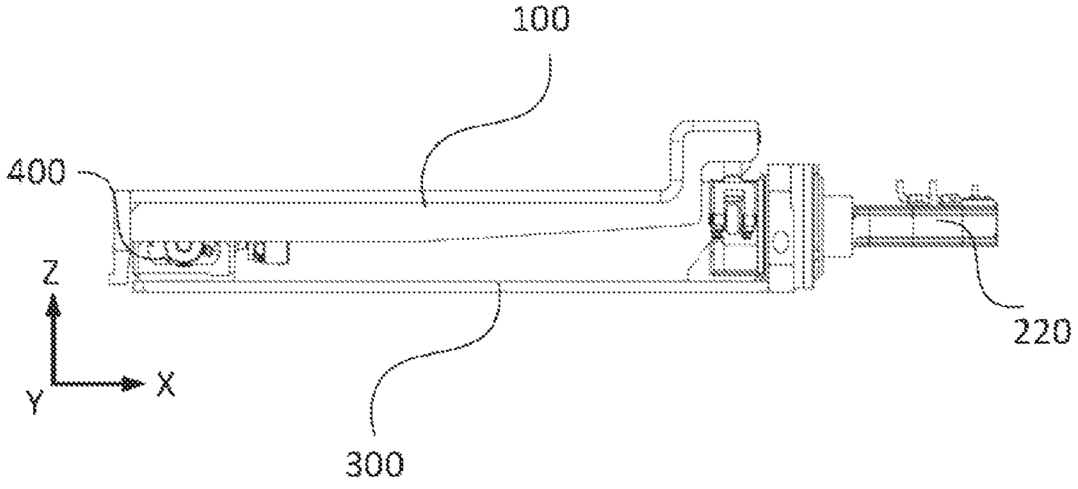
FIG. 2B is a side view illustrating a first state of a motion platform according to some embodiments of the present disclosure.
Figure 2C:
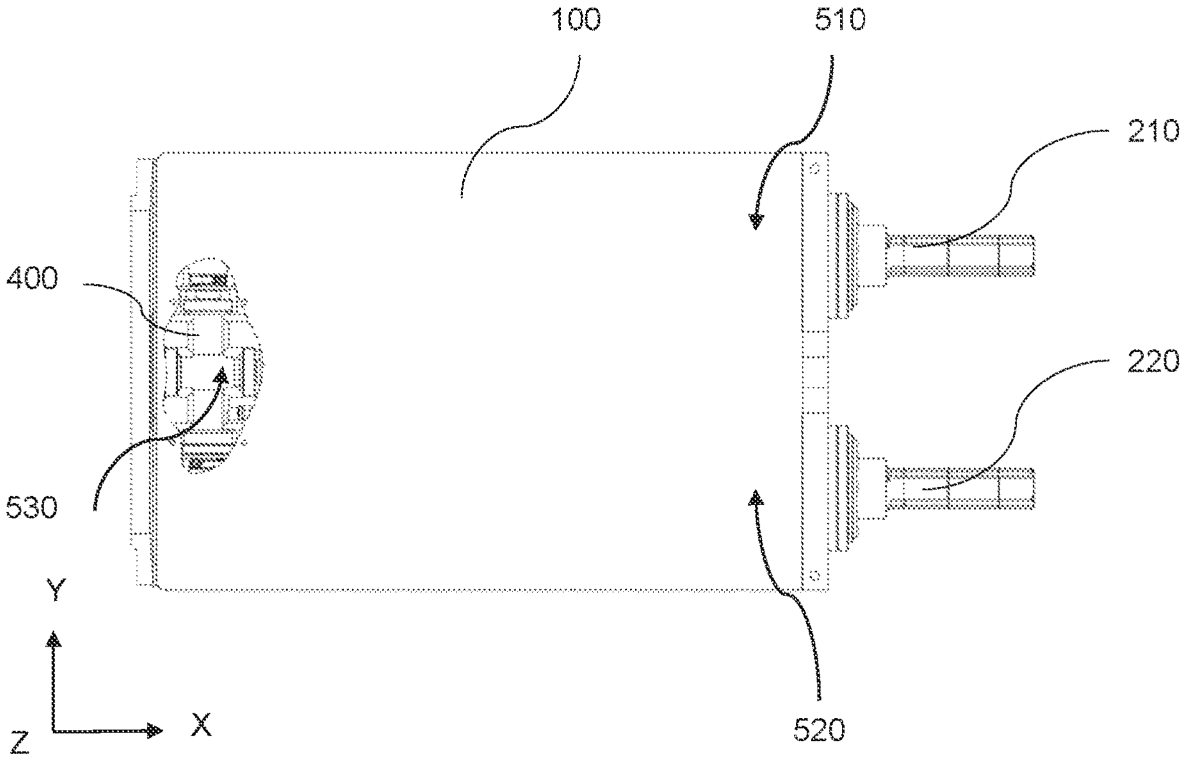
FIG. 2C is a vertical view illustrating a first state of a motion platform according to some embodiments of the present disclosure.
Figure 2D:
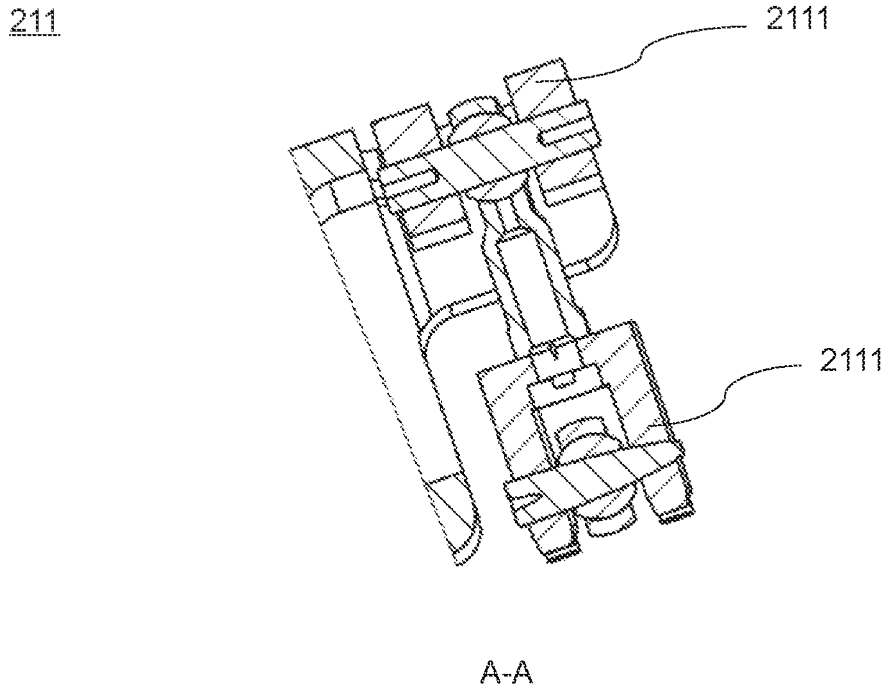
FIG. 2D is a section view illustrating a power conversion unit along an A-A axis in FIG. 2A according to some embodiments of the present disclosure.

FIG. 2A is a front view illustrating a first state of a motion platform according to some embodiments of the present disclosure. FIG. 2B is a side view illustrating a first state of a motion platform according to some embodiments of the present disclosure. FIG. 2C is a vertical view illustrating a first state of a motion platform according to some embodiments of the present disclosure. FIG. 2D is a section view illustrating a power conversion unit along an A-A axis in FIG. 2A according to some embodiments of the present disclosure. A first state of a motion platform may refer to a state in which the motion plate 100 is at a starting position. For example, the first state may be a state in which the motion plate 100 remains horizontal.

As shown in FIG. 2A and FIG. 2B, in some embodiments, the moveable platform may include two driving mechanisms (i.e., the first driving mechanism 210 and the second driving mechanism 220). The first driving mechanism 210 and the second driving mechanism 220 may be configured to drive the moveable plate 100 to rotate around the fulcrum mechanism 400. In some embodiments, coordinates of a support point corresponding to the first driving mechanism 210 at an X-axis and a Z-axis may be the same as coordinates of a support point corresponding to the second driving mechanism 220 on the X-axis and the Z-axis, respectively.

In some embodiments, the moveable plate 100 (e.g., a bottom surface of the moveable plate 100) may include three non-collinear support points, for example, a first support point 510, a second support point 520, and a third support point 530. In some embodiments, the first driving mechanism 210 and the second driving mechanism 220 may be connected to the moveable plate 100 at the first support point 510 and the second support point 520, respectively. The fulcrum mechanism 400 may be connected to the moveable plate 100 at the third support point 530. In some embodiments, the first driving mechanism 210 and the second driving mechanism 220 may cause the moveable plate 100 to move in at least two degrees of freedom relative to the third support point 530. In some embodiments, the degrees of freedom of the moveable plate 100 relative to the third support point 530 may include a rotational degree of freedom around the X-axis, a rotational degree of freedom around the Y-axis, or the like, or any combination thereof. For example, the rotational degree of freedom around the X-axis may be a pitch rotational degree of freedom, and the rotational degree of freedom around the Y-axis may be a roll rotational degree of freedom. As used herein, the pitch rotational degree of freedom and the roll rotational degree of freedom may be simultaneously controlled by the first driving mechanism 210 and the second driving mechanism 220.

In some embodiments, the first driving mechanism 210 may be configured to drive the first support point 510 to move so as to drive the moveable plate 100 to move. The second driving mechanism 220 may drive the second support point 520 to move so as to drive the moveable plate 100 to move. The fulcrum mechanism 400 may be configured to provide a rotational degree of freedom centered on the third support point 530 for the moveable plate 100.

In some embodiments, the first support point 510, the second support point 520, and the third support point 530 may form an arbitrary triangle. In some embodiments, a ratio of a distance from the first support point to the third support point and a distance from the second support point to the third support point may be within a range of 0.9 to 1.1. For example, the ratio of the distance from the first support point to the third support point and the distance from the second support point to the third support point may include, but not be limited to, 0.9, 0.95, 0.98, 1, 1.02, 1.05, 1.1, etc.

In some embodiments, the first support point 510, the second support point 520, and the third support point 530 may form an isosceles triangle. A distance from the third support point to the first support point may be the same as a distance from the third support point to the second support point so as to construct two equal sides in the isosceles triangle. By regularly (or approximately regularly) disposing the first support point 510, the second support point 520, and the third support point 530, the moveable plate 100 may be caused to rotate to an appropriate tilt angle efficiently. For example, when the first support point 510, the second support point 520, and the third support point 530 form an isosceles triangle, in order to cause the moveable plate 100 to rotate merely along the Y-axis, the first support point 510 and the second support point 520 may be caused to move a same distance.

In some embodiments, the first support point 510, the second support point 520, and the third support point 530 may form an equilateral triangle. An arrangement of the equilateral triangle may cause the moveable plate 100 to move to an appropriate tilt angle efficiently.

In some embodiments, the first support point 510 and the second support point 520 may be close to one side of the moveable plate 100, and the third support point 530 may be close to another side of the moveable plate 100. The another side may be opposite to the one side. In other words, the support points (i.e., the first support point 510 and the second support point 520) corresponding to the first driving mechanism 210 and the second driving mechanism 220 may be disposed on one side of the moveable plate 100, respectively, and the third support point 530 corresponding to the fulcrum mechanism 400 may be disposed on the another side of the moveable plate 100. Through the arrangement, a distance between the fulcrum mechanism 400 and the driving mechanism may be increased. In addition, a driving force provided by the first driving mechanism 210 may be the same as a driving force provided by the second driving mechanism 220, which may improve a torque on the support points (e.g., the first support point 510, the second support point 520, and/or the third support point 530). Therefore, a load capacity of the moveable plate 100 may be improved.

In some embodiments, a distance between the fulcrum mechanism 400 and the first driving mechanism 210 along the X-axis and a distance between the fulcrum mechanism 400 and the second driving mechanism 220 along the X-axis may be adjusted according to a force demand and the tilt angle required by the moveable plate 100. The greater the distance (e.g., the distance between the fulcrum mechanism 400 and the first driving mechanism 210 along the X-axis and/or the distance between the fulcrum mechanism 400 and the second driving mechanism 220 along the X-axis) is, the greater the load capacity of the moveable plate 100 may be when the first driving mechanism 210 or the second driving mechanism 220 is born under an action of a same driving force. The smaller the distance (e.g., the distance between the fulcrum mechanism 400 and the first driving mechanism 210 along the X-axis and/or the distance between the fulcrum mechanism 400 and the second driving mechanism 220 along the X-axis) is, the greater the tilt angle of the moveable plate 100 may be when the first driving mechanism 210 or the second driving mechanism 220 outputs a same driving stroke.

In some embodiments, a driving mechanism (e.g., the first driving mechanism 210 and/or the second driving mechanism 220) may be configured to drive a support point (e.g., the first support point 510 and/or the second support point 520) to move laterally. In some embodiments, the first driving mechanism 210 and the second driving mechanism 220 may move synchronously or asynchronously (e.g., move in dislocation).

Figure 3A:
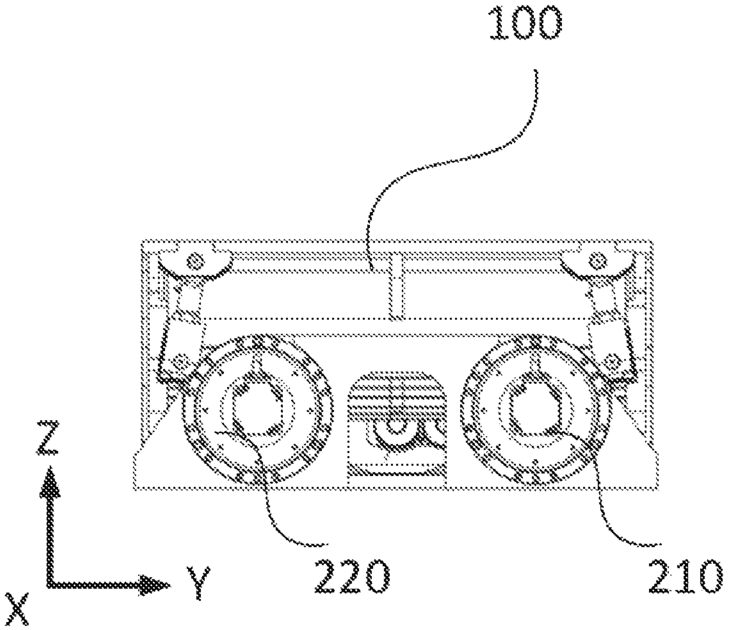
FIG. 3A is a front view illustrating a second state of a motion platform according to some embodiments of the present disclosure.
Figure 3B:
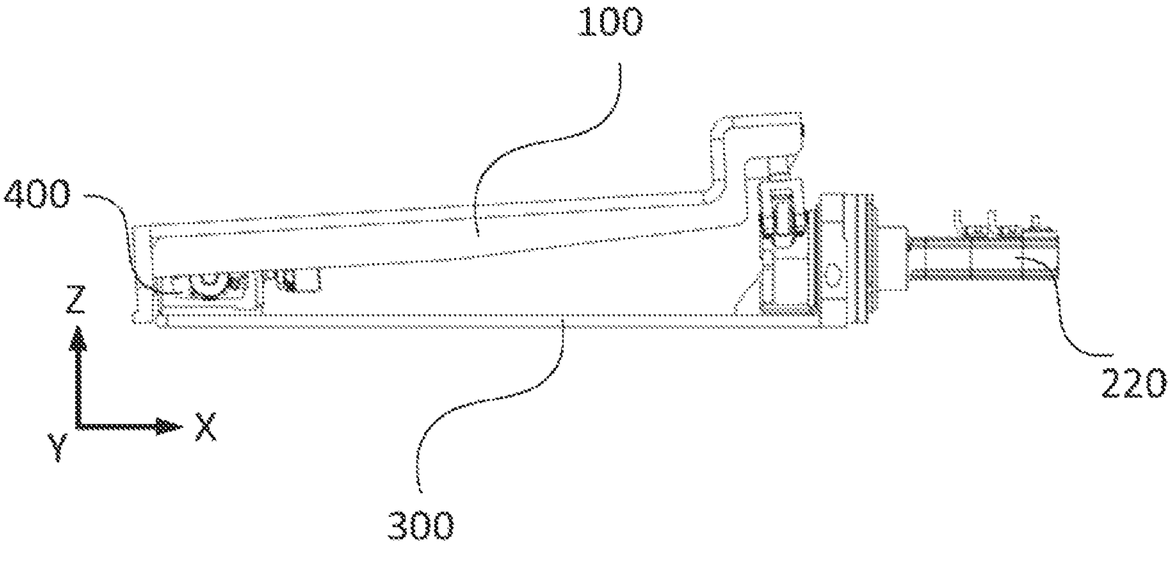
FIG. 3B is a side view illustrating a second state of a motion platform according to some embodiments of the present disclosure.

FIG. 3A is a front view illustrating a second state of a motion platform according to some embodiments of the present disclosure. FIG. 3B is a side view illustrating a second state of a motion platform according to some embodiments of the present disclosure. A second state of a motion platform may refer to a tilted state after the motion plate 100 rotates around the Y-axis.

As shown in FIG. 3A and FIG. 3B, the first driving mechanism 210 and the second driving mechanism 220 may drive corresponding support points (the first support point 510 and the second support point 520), respectively, to move along a Z-axis under a same driving stroke. The fulcrum mechanism 400 may merely provide a rotational degree of freedom along a Y-axis and limit rotational degrees of freedom in other directions. The moveable plate 100 may merely rotate around the Y-axis. Therefore, when the moveable plate 100 tilts along the Y-axis, the moveable plate 100 may be prevented from moving in the other directions, thereby ensuring the accuracy of the motion platform.

Figure 4A:
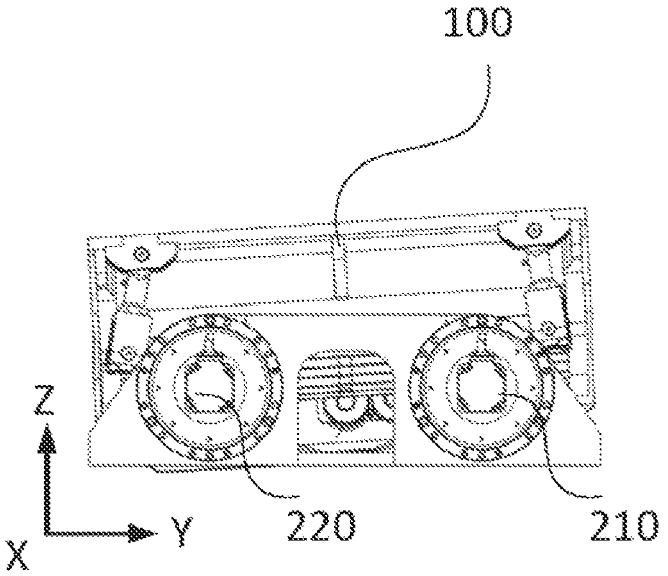
FIG. 4A is a front view illustrating a third state of a motion platform according to some embodiments of the present disclosure.
Figure 4B:
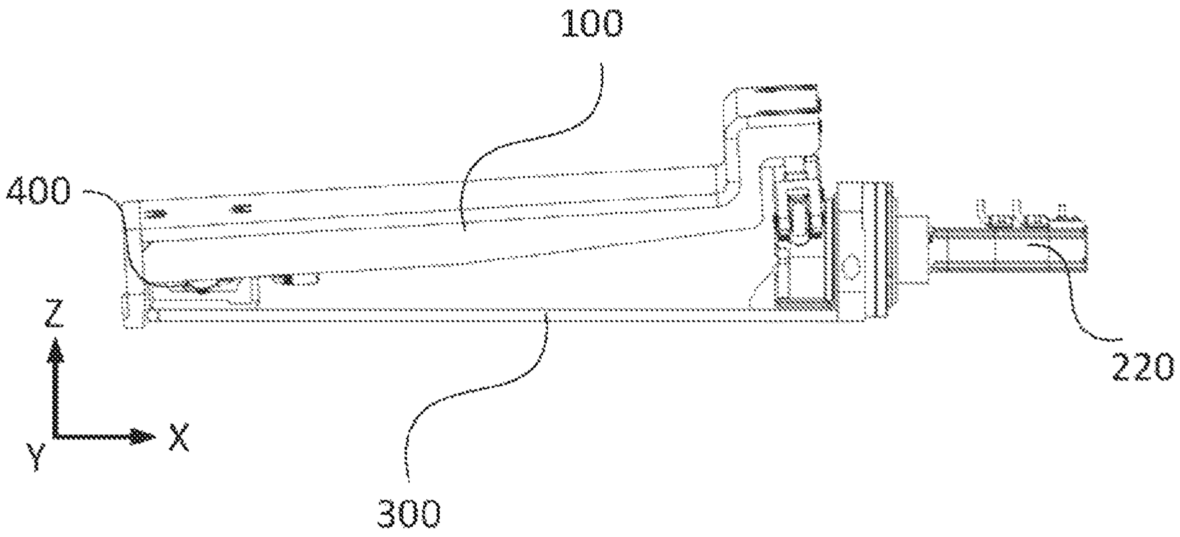
FIG. 4B is a side view illustrating a third state of a motion platform according to some embodiments of the present disclosure.

FIG. 4A is a front view illustrating a third state of a motion platform according to some embodiments of the present disclosure. FIG. 4B is a side view illustrating a third state of a motion platform according to some embodiments of the present disclosure. As shown in FIG. 4A and FIG. 4B, a driving stroke of the first driving mechanism 210 to the moveable plate 100 may be greater or less than a driving stroke of the second driving mechanism 220 to the moveable plate 100. The fulcrum mechanism 400 may merely provide a rotational degree of freedom in an X-axis and limit rotational degrees of freedom in other directions. The moveable plate 100 may merely rotate around the X-axis. Thus, when the moveable plate 100 tilts along the X-axis, the moveable plate 100 may be prevented from moving in the other directions, thereby ensuring the accuracy of the motion platform.

In some embodiments, the fulcrum mechanism 400 may provide rotational degrees of freedom in the X-axis and the Y-axis. In some embodiments, the first driving mechanism 210 may be configured to drive the first support point 510 to move, the second driving mechanism 220 may be configured to drive the second support point 520 to move. The moved first support point 510, the moved second support point 520, and the third support point 530 may be configured to jointly determine a plane where the moveable plate 100 is disposed.

In some embodiments, the first driving mechanism 210 and/or the second driving mechanism 220 may include a rotation drive unit and a power conversion unit. The power conversion unit may be configured to convert a rotational motion of the rotation driving unit into a vertical motion of a corresponding support point.

As shown in FIGS. 2A-2D, the rotation driving unit may provide a movement of rotation around the X-axis. Through the power conversion unit, the movement of rotation around the X-axis may be converted into a linear movement along the Z-axis. The first driving mechanism 210 may be taken as an example for illustration.

In the first driving mechanism 210, the rotation driving unit may include a first rotation motor 213, and the power conversion unit may include a first rocker 211. One end of the first rocker 211 may be rotationally connected to an output end of the first rotation motor 213, and another end of the first rocker 211 may be rotationally connected to the moveable plate 100. Thus, when the first rotation motor 213 rotates around the X-axis, the first rocker 211 may be driven to move along the Z-axis, and then a support point (i.e., the first support point 510) corresponding to the first driving mechanism 210 may be driven to move along the Z-axis. In some embodiments, the support point (i.e., the first support point 510) corresponding to the first driving mechanism 210 may be a connection point between the another end of the first rocker 211 and the moveable plate 100. In some embodiments, a configuration of the second drive mechanism 220 may be similar to a configuration of the first drive mechanism 210.

In some embodiments, the power conversion unit may further include a first reducer 212. The first reducer 212 may be disposed at the output end of the first rotation motor 213, and the first rocker 211 may be connected to the output end through the first reducer 212. The first reducer 212 may include a transmission device disposed between the first rotation motor 213 and the first rocker 211 to reduce a speed of the output end of the first rotation motor 213. In some embodiments, the first reducer 212 may increase a rotation torque of the output end, so that a rotation torque of the first driving mechanism 210 may be improved, thereby increasing the load capacity of the moveable plate 100. At the same time, by increasing a conversion-rotation ratio of the first reducer 212, a mechanical error of the output end of the first rotation motor 213 may be reduced. Therefore, a stroke accuracy of the first driving mechanism 210 may be improved, thereby improving a motion accuracy of the motion platform.

In some embodiments, both ends of the first rocker 211 may be disposed with joint bearings 2111. The both ends of the first rocker 211 may be rotationally connected to the output end and the moveable plate 100 through the corresponding joint bearings 2111. In some embodiments, the joint bearings 2111 may include spherical sliding bearings. Sliding contact surfaces of each of the spherical sliding bearings may include an inner spherical surface and an outer spherical surface. Therefore, the spherical sliding bearings may rotate and swing at any angle during the motion. Surfaces (e.g., the inner spherical surface and/or the outer spherical surface) of the spherical sliding bearings may be manufactured via various special processing techniques such as phosphating, cratering, pad inlay, spraying, or the like, or any combination thereof. The joint bearings 2111 may have features of large load capacity, impact resistance, corrosion resistance, wear resistance, self-aligning, and good lubrication, which may further improve the load capacity and the motion accuracy of the motion platform. In some embodiments, when the moveable plate 100 is caused to rotate, the first support point 510 and the second support point 520 may move away from the Z-axis. By disposing the spherical sliding bearing, the stability and the motion accuracy of each of the at least two driving mechanisms (the first driving mechanism 210 and/or the second driving mechanism 220) may be improved when driving the support point.

A structure of the second driving mechanism 220 may be similar to the structure of the first driving mechanism 210, which is not repeated herein. For example, the second driving mechanism 220 may include a second rocker 221, a second reducer 222, and a second rotation motor 223.

In some embodiments, the first driving mechanism 210 and/or the second driving mechanism 220 may further include a linear driving unit. The linear driving unit may include a linear motor. An output end of the linear motor may be directly connected to a corresponding support point. The linear motor may be disposed along the Z-axis and may directly drive the corresponding support point to move along the Z-axis. The linear driving unit may include an electric push rod, a hydraulic cylinder, an electric cylinder, a screw elevator, a pneumatic rod, etc., which is not limited herein.

In some embodiments, uplifts 110 may be disposed a place between the first driving mechanism 210 and the corresponding support point (i.e., the first support point 510) and a place between the second driving mechanism 220 and the corresponding support point (i.e., the second support point 520). The uplifts 110 may cause that the first driving mechanism 210 and the second driving mechanism 220 are hidden in the uplifts 110, so that the base plate 300 and the moveable plate 100 may remain parallel at a starting position.

Figure 5A:
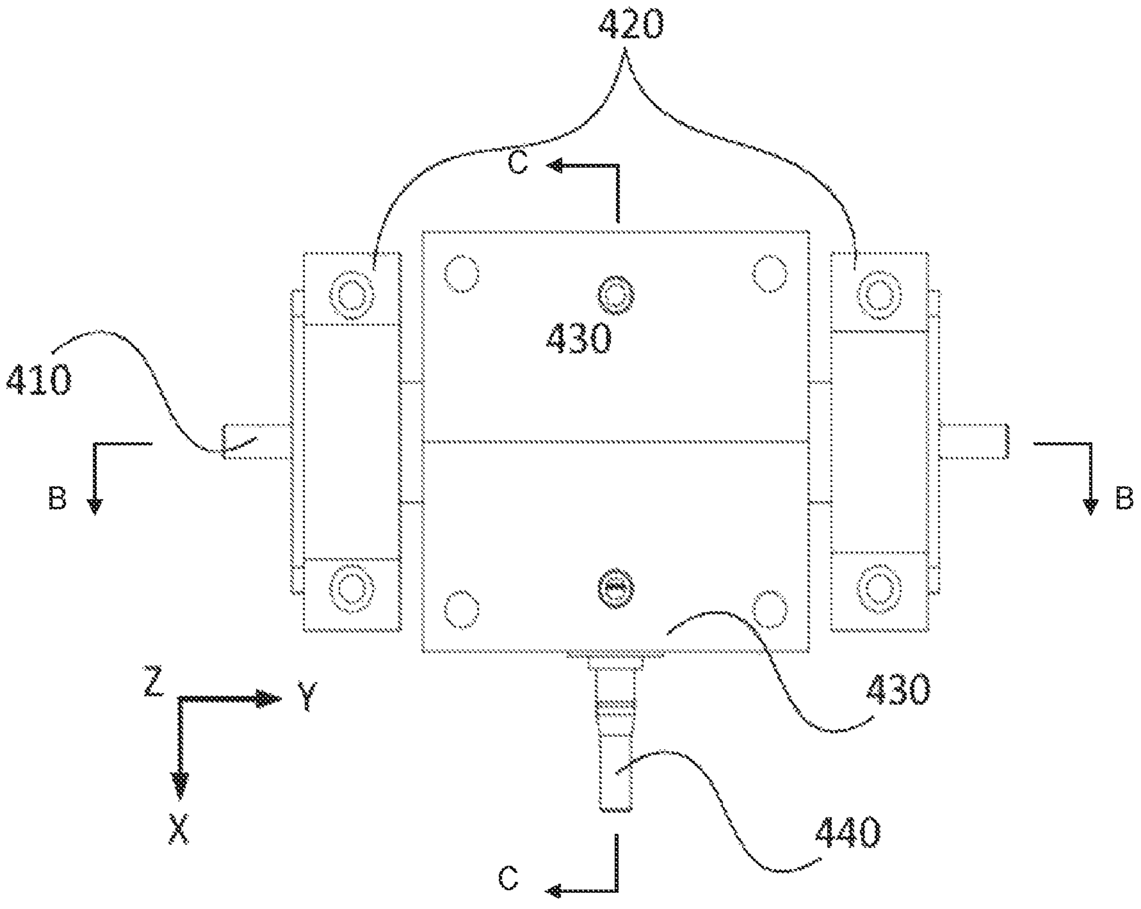
FIG. 5A is a schematic diagram illustrating an exemplary fulcrum mechanism according to some embodiments of the present disclosure.
Figure 5B:
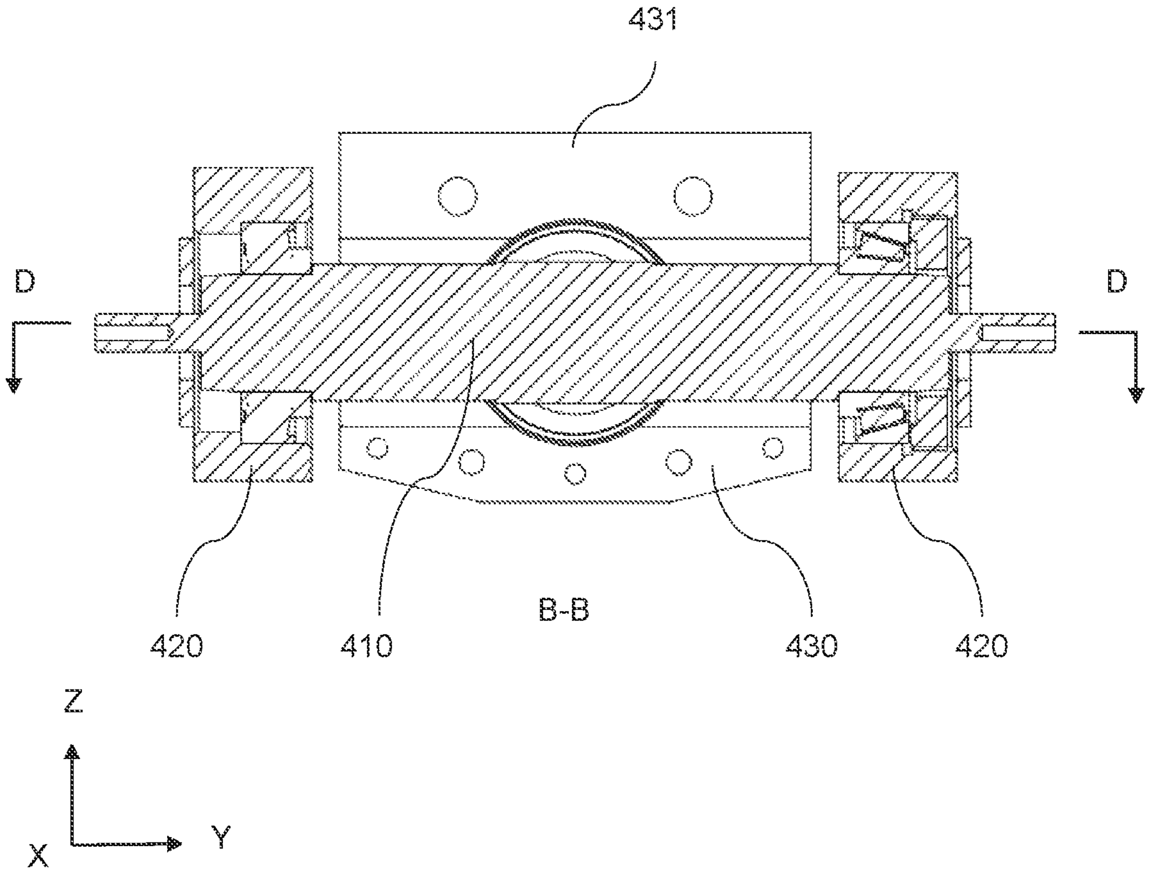
FIG. 5B is a section view illustrating a fulcrum mechanism along a B-B axis in FIG. 5A according to some embodiments of the present disclosure.
Figure 5C:
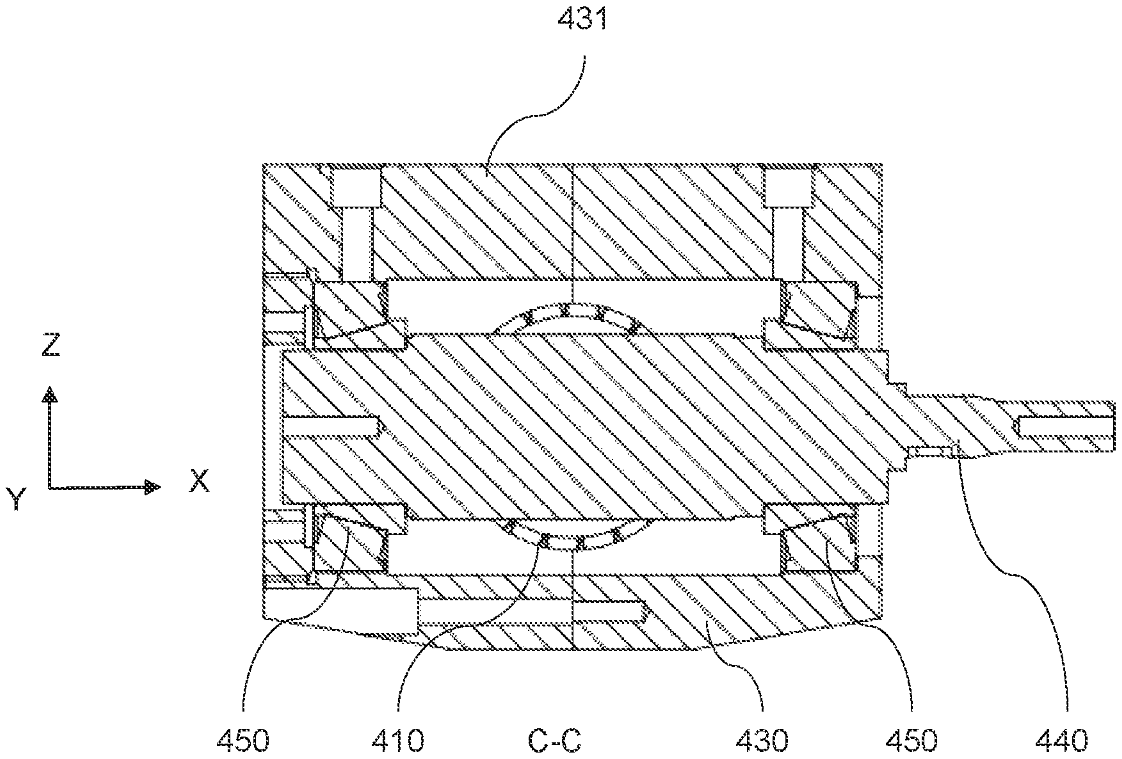
FIG. 5C is a section view illustrating a fulcrum mechanism along a C-C axis in FIG. 5A according to some embodiments of the present disclosure.
Figure 5D:
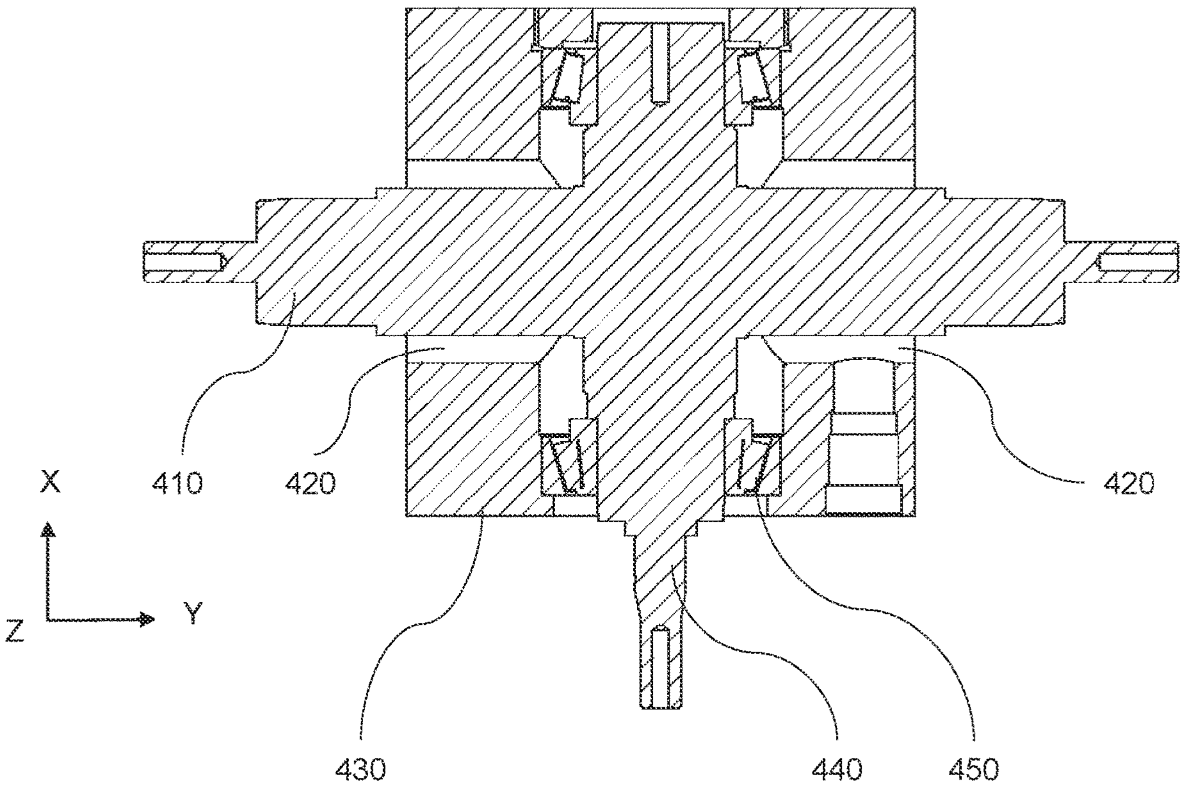
FIG. 5D is a section view illustrating a fulcrum mechanism along a D-D axis in FIG. 5B according to some embodiments of the present disclosure.

FIG. 5A is a schematic diagram illustrating an exemplary fulcrum mechanism 400 according to some embodiments of the present disclosure. FIG. 5B is a section view illustrating the fulcrum mechanism 400 along a B-B axis in FIG. 5A according to some embodiments of the present disclosure. FIG. 5C is a section view illustrating the fulcrum mechanism 400 along a C-C axis in FIG. 5A according to some embodiments of the present disclosure. FIG. 5D is a section view illustrating the fulcrum mechanism 400 along a D-D axis in FIG. 5B according to some embodiments of the present disclosure.

As shown in FIGS. 5A-5D, the fulcrum mechanism 400 may include a first rotation unit and a second rotation unit. In some embodiments, an angle between a rotation shaft of the first rotation unit and a rotation shaft of the second rotation unit may be within a range of 85 degrees to 90 degrees, for example, 85 degrees, 86 degrees, 87 degrees, 88 degrees, 90 degrees, etc., so that rotational degrees of freedom in two vertical directions may be provided for the moveable plate 100. In some embodiments, the rotation shaft of the first rotation unit may be perpendicular to the rotation shaft of the second rotation unit, the rotation shaft of the first rotation unit may be parallel to a Y-axis, the rotation shaft of the second rotation unit may be parallel to an X-axis, and the X-axis and Y-axis may be perpendicular to each other.

In some embodiments, a relative position between the rotation shaft of the first rotation unit and the rotation shaft of the second rotation unit may remain. Thus, the rotation stability of the moveable plate may be improved.

In some embodiments, the rotation shaft of the first rotation unit may be perpendicular to the rotation shaft of the second rotation unit, and the relative position between the rotation shaft of the first rotation unit and the rotation shaft of the second rotation unit may remain. In some embodiments, the first rotation unit may be connected to the base plate 300, the second rotation unit may be connected to the moveable plate 100, and the moveable plate 100 may rotate through the first rotation unit or the second rotation unit.

In some embodiments, the base plate 300 of the moveable platform may provide a stable and flat support foundation. The first driving mechanism 210, the second driving mechanism 220, and the fulcrum mechanism 400 may be disposed on the base plate 300. In some embodiments, the first rotation unit may be connected to the base plate 300, the second rotation unit may be connected to the moveable plate 100, and the moveable plate 100 may rotate relative to the base plate 300 through the first rotation unit and/or the second rotation unit. In some embodiments, the moveable plate 100 may rotate around the Y-axis relative to the base plate through the first rotation unit. In some embodiments, the moveable plate 100 may rotate around the X-axis relative to the base plate through the second rotation unit.

In some embodiments, the first rotation unit may include a first rotation shaft 410 and a first bearing seat 420. The first bearing seat 420 may be configured to connect the first rotation shaft 410 to the base plate 300. The second rotation unit may include a second rotation shaft 440 and a second bearing seat. The second bearing seat may be configured to connect the second rotation shaft 440 to the moveable plate 100. In some embodiments, the fulcrum mechanism 400 may include a fixed seat 430. The first rotation shaft 410 and the second rotation shaft 440 may be fixed on the fixed seat 430, and an axis of the first rotation shaft may intersect with an axis of the second rotation shaft.

In some embodiments, the first rotation shaft 410 may be integral with the second rotation shaft 440. As shown in FIG.

5D, in some embodiments, the first rotation shaft 410 and the second rotation shaft 440 may form an integral cross rotation shaft part. The integral cross rotation shaft part may have features, such as a strong connection stability, a small occupied space, etc.

In some embodiments, the first rotation shaft 410 and the second rotation shaft 440 may be two independent rotation shafts. A spatial angle of the first rotation shaft 410 and the second rotation shaft 440 may be within a range of 85 degrees to 90 degrees, but the first rotation shaft 410 and the second rotation shaft 440 may not intersect with each other. In some embodiments, one of the first rotation shaft 410 and the second rotation shaft 440 may be disposed above the other of the first rotation shaft 410 and the second rotation shaft 440. For example, the second rotation shaft 410 may be disposed above the first rotation shaft 410. As another example, the first rotation shaft 410 may be connected to the base plate 300 through the first bearing seat 420, the second rotation shaft 440 may be disposed above the first rotation shaft 410 and fixed relative to the first rotation shaft 410, and the second rotation shaft 440 may be connected to the moveable plate 100 through the second bearing seat 450.

In some embodiments, the second bearing seat 450 may be connected to the moveable plate 100 through a connecting plate 431. In some embodiments, the second bearing seat 450 may be fixed to the connecting plate 431 through a fastener such as a bolt, etc. The connecting plate 431 may be connected to the moveable plate 100 through a welding connection, a fastening connection, a bonding connection, etc. In some embodiments, the connecting plate 431 and the fixed seat 430 may be a same component. In some embodiments, the connecting plate 431 and the fixed seat 430 may be two different components. By connecting through the connecting plate 431, a contact area between the second bearing seat 450 and the moveable plate 100 may be increased, so as to increase the connection stability between the second bearing seat 450 and the moveable plate 100, thereby improving the stability of the moveable plate 100 when tilting the moveable plate 100.

In some embodiments, the third support point may be a center point (e.g., a geometric center point) of a contact surface between the connecting plate 431 and the moveable plate 100.

In some embodiments, the motion platform may further include an encoder (not shown). The encoder may be disposed on a rotation shaft (e.g., the first rotation shaft 410) of the first rotation unit and/or a rotation shaft (e.g., the second rotation shaft 440) of the second rotation unit. For example, the encoder may be disposed at both ends of the first rotation shaft 410 and/or the second rotation shaft 440. The encoder may be configured to detect a rotation angle of the first rotation shaft 410 and/or the second rotation shaft 440. A processor on a medical device or a medical bed may determine the tilt angle of the moveable plate 100 through the rotation angle of the first rotation shaft 410 and/or the second rotation shaft 440 fed back by the encoder, so as to timely and accurately adjust the tilt angle of the moveable plate 100 and improve a control accuracy.

In some embodiments, the fulcrum mechanism 400 may include a third rotation unit (not shown). An angle between a rotation shaft of the third rotation unit and the rotation shaft (e.g., the first rotation shaft 410) of the first rotation unit may be within a range of 85 degrees to 90 degrees, and an angle between the rotation shaft of the third rotation unit and the rotation shaft (e.g., the second rotation shaft 440) of the second rotation unit may be within a range of 85 degrees to 90 degrees. In some embodiments, the rotation shaft of the third rotation unit may be perpendicular to the rotation shaft of the first rotation unit and the rotation shaft of the second rotation unit, respectively. In some embodiments, a direction of the rotation shaft of the first rotation unit may be parallel to an X-axis, a direction of the rotation shaft of the second rotation unit may be parallel to a Y-axis, and a direction of the rotation shaft of the third rotation unit may be parallel to a Z-axis, wherein the X-axis, the Y-axis, and the Z-axis may be perpendicular to each other.

In some embodiments, the motion platform may include a third driving mechanism (not shown). The third driving mechanism may be configured to cause the moveable plate 100 to move relative to the rotation shaft (e.g., the Z-axis) of the third rotation unit. In some embodiments, the bottom surface of the moveable plate 100 may include a fourth support point. The third driving mechanism may be connected to the moveable plate 100 at the fourth support point. The third driving mechanism may cause the fourth support point to rotate relative to the Z-axis, thereby causing the moveable plate 100 to rotate relative to the Z-axis.

In some embodiments, the fulcrum mechanism 400 may provide additional movement degrees of freedom for the moveable plate 100. For example, the fulcrum mechanism 400 may further provide translational degrees of freedom for the moveable plate 100. In some embodiments, a count (or number) of the degrees of freedom provided by the fulcrum mechanism 400 for the moveable plate 100 may be equal to a count (or number) of drive mechanisms.

Some embodiments of the present disclosure may further provide a medical bed. The medical bed may include a motion platform as described in any one of the above embodiments and a bed plate. The moveable plate 100 of the motion platform may be configured to fix and support the bed plate so as to drive the bed plate to move.

In some embodiments, the medical bed may include a radiotherapy bed, a scanning bed, a catheter bed, or the like, or any combination thereof. In some embodiments, the moveable plate 100 may drive the bed plate of the medical bed such as the radiotherapy bed, the scanning bed, the catheter bed, etc., to rotate so as to adjust the bed plate to a position suitable for image fluoroscopy, thereby achieving an accurate positioning of a tumor position.

In some embodiments, the first driving mechanism 210 and the second driving mechanism 220 may be disposed at intervals along a width direction of the medical bed. The arrangement may be convenient to adjust tilt angles of the head and tail of the medical bed and tilt angles of left and right sides of the medical bed. In some embodiments, the first driving mechanism 210 and the second driving mechanism 220 may be disposed at intervals along the width direction of the medical bed, and the first support point, the second support point, and the third support point may form an isosceles triangle. Therefore, the fulcrum mechanism may provide a stable support for the medical bed, and facilitate to cause the bed plate to rotate to an appropriate tilt angle.

Some embodiments of the present disclosure may further provide a radiotherapy bed. The radiotherapy bed may include a motion platform. The moveable plate 100 of the motion platform may be configured to fix and support the radiotherapy bed so as to drive the radiotherapy bed to move.

Some embodiments of the present disclosure may further provide another radiotherapy bed. The radiotherapy bed may include a bed plate and a motion platform. The bed plate may extend along an X-axis and a Y-axis. The motion platform may include the moveable plate 100, the base plate 300, the fulcrum mechanism 400, the first driving mechanism 210, and the second driving mechanism 220. The bed plate may be supported by the moveable plate 100. The fulcrum mechanism 400, the first driving mechanism 210, and the second driving mechanism 220 may be disposed on the base plate 300. The fulcrum mechanism 400, the first driving mechanism 210, and the second driving mechanism 220 may be connected to the moveable plate 100, respectively. The first driving mechanism 210 and the second driving mechanism 220 may be disposed at intervals along the Y-axis. The first driving mechanism 210, the second driving mechanism 220, and the fulcrum structure 400 may be disposed at intervals in the X-axis. One or two of the first driving mechanism 210 and the second driving mechanism 220 may drive the moveable plate 100 to tilt relative to the Y-axis or the X-axis. The fulcrum mechanism 400 may provide a rotational degree of freedom for the moveable plate 100 in a tilt direction of the moveable plate 100.

Some embodiments of the present disclosure may further provide a medical device. The medical device may include a medical bed as described in any one of the above embodiments. In some embodiments, the medical bed may include a radiotherapy bed, a scanning bed, a catheter bed, or the like, or any combination thereof. In some embodiments, the medical bed may be a radiotherapy bed, and the radiotherapy bed may include a motion platform. The moveable plate 100 of the moving platform may be configured to fix and support the radiotherapy bed so as to drive the radiotherapy bed to move. A radiotherapy object may lie on the radiotherapy bed, and the motion platform may drive the radiotherapy bed to move to adjust a location of the radiotherapy object, so that a tumor location of the radiotherapy object may align with a radiation source. When the radiation source is started, a radiotherapy may be performed on the tumor location of the radiotherapy object. In some embodiments, the medical device may include a radiotherapy device, a scanning device, a catheter device, or the like, or any combination thereof.

Figure 6:
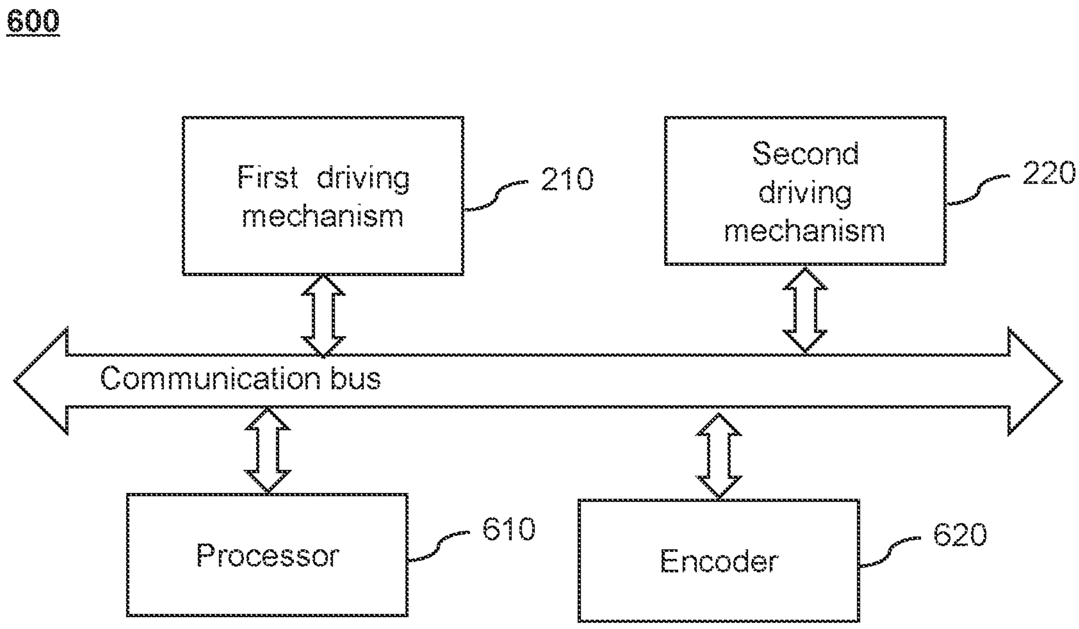
FIG. 6 is a schematic diagram illustrating an exemplary structure of a control device of a medical device according to some embodiments of the present disclosure.

FIG. 6 is a schematic diagram illustrating an exemplary structure of a control device of a medical device according to some embodiments of the present disclosure.

As shown in FIG. 6, a control device 600 of a medical device may include a processor 610, a communication bus, and an encoder 620. A communication process between the processor 610, the encoder 620, and the first driving mechanism 210 and/or the second driving mechanism 220 may be implemented through the communication bus. The processor 610 may control a motion of the driving mechanism 210 and/or the second driving mechanism 220 so as to control a medical bed of the medical device to move. In some embodiments, the processor 610 of the medical device may be in signal connection with (e.g., electrically connected to) the first driving mechanism 210 and the second driving mechanism 220.

In some embodiments, the processor 610 may be in signal connection with (e.g., electrically connected to) the encoder 620, and determine whether a bed plate of the medical bed moves to a target location based on a signal of the encoder 620. If the processor 610 determines that the bed plate moves to the target location based on the signal of the encoder 620, the processor 610 may control the first driving mechanism 210 and/or the second driving mechanism 220 to stop. If the processor 610 determines that the bed plate does not move to the target location based on the signal of the encoder 620, the processor 610 may continue to control the first driving mechanism 210 and/or the second driving mechanism 220 to move the bed plate towards a target tilt angle based on an actual tilt angle and the target tilt angle of the bed plate.

In some embodiments, the processor 610 may be implemented using a central processor 610, a server, a terminal device, or any other possible processing device. In some embodiments, the above central processor 610, the server, the terminal device, or the other processing device may be implemented on a cloud platform. In some embodiments, the above central processor 610, the server, or the other processing devices may be interconnected with various terminal devices, and the terminal device may perform information processing (or a portion).

Figure 7:
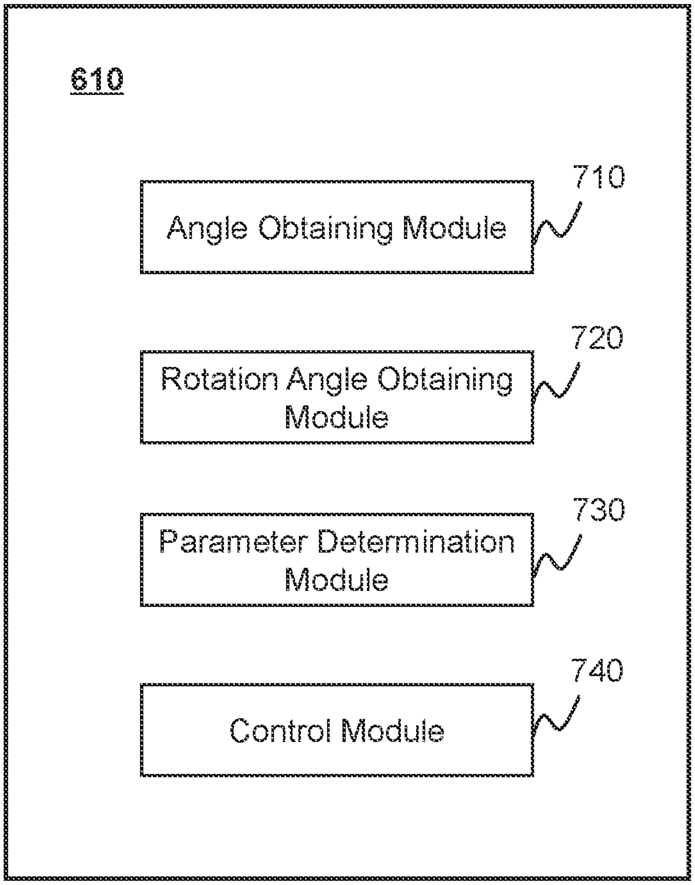
FIG. 7 is a schematic diagram illustrating an exemplary processor of a medical device according to some embodiments of the present disclosure.

FIG. 7 is a schematic diagram illustrating an exemplary processor 610 of a medical device according to some embodiments of the present disclosure.

As shown in FIG. 7, the processor 610 may include an angle obtaining module 710, a rotation angle obtaining module 720, a parameter determination module 730, and a control module 740.

The angle obtaining module 710 may be configured to obtain a current rotation angle and a target rotation angle of the motion platform. Each of the current rotation angle and the target rotation angle may be a rotation angle of the motion platform rotating around at least one predetermined coordinate axis. More descriptions regarding the obtaining the current rotation angle and the target rotation angle of the motion platform may be found elsewhere in the present disclosure. See, e.g., operation 802 and relevant descriptions thereof.

The rotation angle obtaining module 720 may be configured to obtain a motor rotation angle for driving the motion platform based on the current rotation angle and the target rotation angle. More descriptions regarding the obtaining the motor rotation angle for driving the motion platform may be found elsewhere in the present disclosure. See, e.g., operation 804 and relevant descriptions thereof.

The parameter determination module 730 may be configured to determine at least one motor motion control parameter of the rotation motor based on the motor rotation angle. The at least one motor motion control parameter refers to parameter(s) for controlling the rotation motor (e.g., the first rotation motor 213 or the second rotation motor 223 as shown in FIG. 1B) to move. More descriptions regarding the determination of the at least one motor motion control parameter of the rotation motor may be found elsewhere in the present disclosure. See, e.g., operation 806 and relevant descriptions thereof.

The control module 740 may be configured to drive the rotation motor based on the at least one motor motion control parameter. The rotation motor may be configured to control the rotation angle of the motion platform. More descriptions regarding the driving the rotation motor may be found elsewhere in the present disclosure. See, e.g., operation 808 and relevant descriptions thereof.

It should be noted that the above descriptions of the processor 610 are provided for the purposes of illustration, and are not intended to limit the scope of the present disclosure. For persons having ordinary skills in the art, various variations and modifications may be conducted under the guidance of the present disclosure. However, those variations and modifications do not depart from the scope of the present disclosure. In some embodiments, the processor 610 may include one or more other modules. For example, the processor 610 may include a storage module to store data generated by the modules in the processor 610. In some embodiments, any two of the modules may be combined as a single module, and any one of the modules may be divided into two or more units.

Figure 8:
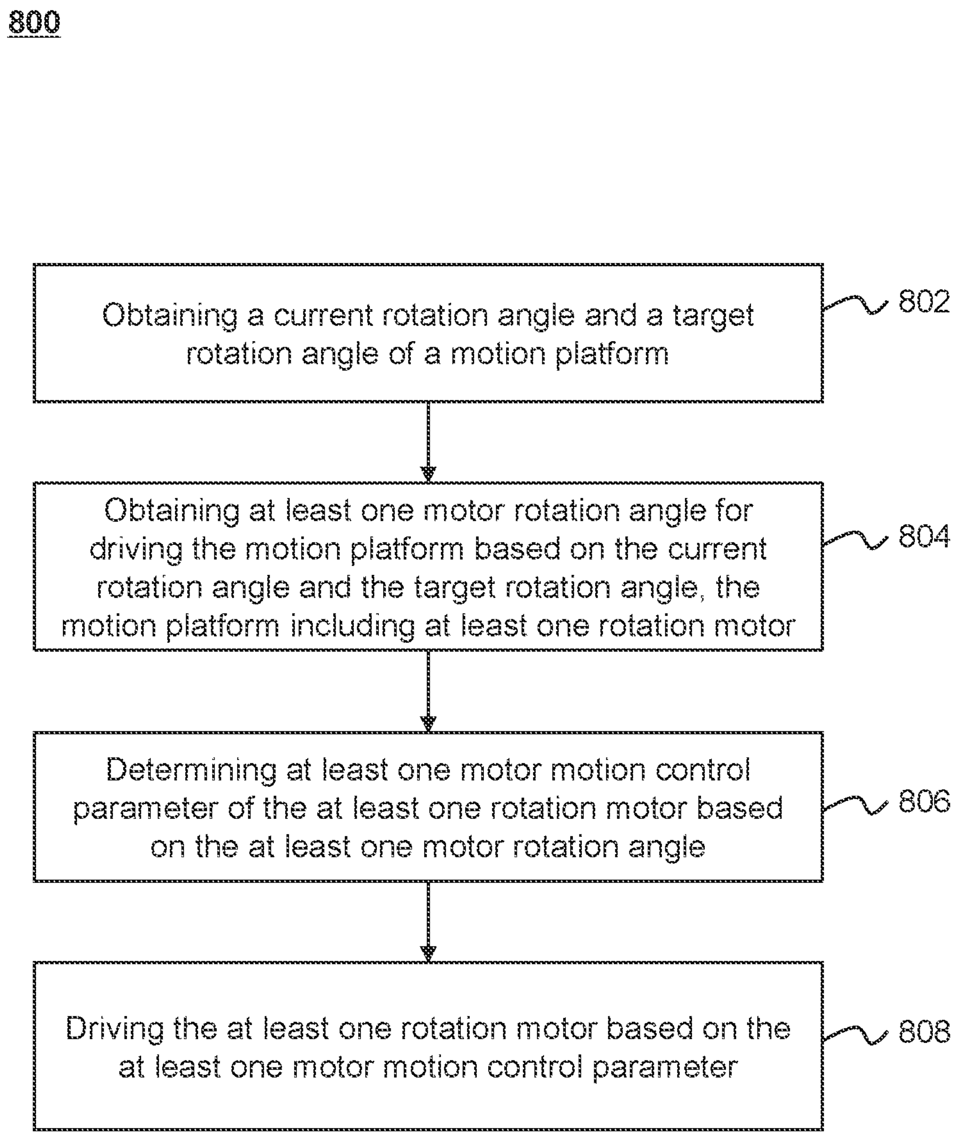
FIG. 8 is a flowchart illustrating an exemplary process for controlling a motion platform according to some embodiments of the present disclosure.

FIG. 8 is a flowchart illustrating an exemplary process 800 for controlling a motion platform according to some embodiments of the present disclosure.

At present, a motion platform is driven to a target location by determining a positioning difference between a current location and the target location of the motion platform based on a medical image (e.g., a CT image), and directing the motion platform to move to the target location based on the positioning difference through a driving mechanism. However, the motion accuracy of the motion platform may be low, which reduces the accuracy of the tumor positioning. In order to solve the above problems, the process 800 may be performed.

In 802, the processor 610 (e.g., the angle obtaining module 710) may obtain a current rotation angle and a target rotation angle of the motion platform. Each of the current rotation angle and the target rotation angle may be a rotation angle of the motion platform rotating around at least one predetermined coordinate axis.

The current rotation angle may be a rotation angle at which the motion platform is currently located, and the target rotation angle may be a predetermined rotation angle at which the motion platform is located after the motion platform is controlled.

In some embodiments, the current rotation angle may be an angle at which the motion platform has rotated around the X-axis or the Y-axis before the motion platform is controlled to rotate. For example, as shown in FIG. 1B, when the motion platform is in a horizontal state, the motion platform (e.g., the moveable plate 100 or the base plate 300 of the motion platform) may be parallel to the X-axis and/or around the Y-axis. That is, a rotation angle of the motion platform around the X-axis or around the Y-axis may be determined as 0 degrees. When the motion platform is in a non-horizontal state, an angle formed between the motion platform and the X-axis or the Y-axis may be determined as the current rotation angle. The target rotation angle refers to a rotation angle around the X-axis or the Y-axis that needs to be achieved after a rotation of the motion platform. The predetermined coordinate axis may be the X-axis or the Y-axis. In some embodiments, the predetermined coordinate axis may be determined according to actual situation(s). For example, the motion platform may be determined to rotate around a specific axis according to an established coordinate axis system.

For example, a rotation angle (a pitch rotational degree of freedom or a roll rotational degree of freedom) around the X-axis or the Y-axis at which the motion platform is currently located may be obtained, and determined as the current rotation angle. The rotation angle around the X-axis or around the Y-axis that needs to be achieved after the rotation of the motion platform may be determined as the target rotation angle. In such way, by obtaining the current rotation angle and the target rotation angle, reverse modeling can be performed based on an angle of the motion platform, rather than directly obtaining parameters for controlling driving mechanism(s) (e.g., the first driving mechanism 210, the second driving mechanism 220, etc.) based on locations (s) of the driving mechanism(s), which can improve the accuracy of the motion of the motion platform.

In 804, the processor 610 (e.g., the rotation angle obtaining module 720) may obtain at least one motor rotation angle for driving the motion platform based on the current rotation angle and the target rotation angle.

A motor rotation angle may be an angle that a rotation motor of a driving mechanism (e.g., the first rotation motor 213 of the first driving mechanism 210, the second rotation motor 223 of the second driving mechanism 220, etc.) needs to rotate.

For example, the motor rotation angle of the rotation motor may be obtained by performing the reverse modeling based on the current rotation angle and the target rotation angle. In such way, the motor rotation angle of the rotation motor can be obtained based on the rotation angle of the motion platform, which can obtain a required angle of the rotation motor that accurately drives the motion platform, thereby improving the accuracy of the motion control.

In 806, the processor 610 (e.g., the parameter determination module 730) may determine at least one motor motion control parameter of the rotation motor based on the at least one motor rotation angle.

The at least one motor motion control parameter refers to parameter(s) for controlling the at least one rotation motor (e.g., the first rotation motor 213 or the second rotation motor 223 as shown in FIG. 1B) to move. The at least one motor motion control parameter may include coded parameter(s) used to control the at least one rotation motor.

For example, the motor motion control parameter of the rotation motor may be obtained based on a transformation relationship between the motor rotation angle and a coded value, and the motor motion control parameter may be a coded value for driving the rotation motor.

In 808, the processor 610 (e.g., the control module 740) may drive the at least one rotation motor based on the at least one motor motion control parameter. The at least one rotation motor may be configured to control the rotation angle of the motion platform.

A count of rotation motors may be at least one. For example, as shown in FIG. 1B, the motion platform may include two rotation motors (e.g., the first rotation motor 213 and the second rotation motor 223).

For example, the at least one rotation motor may be driven using the at least one motor motion control parameter, and the rotation of the motion platform may be controlled by the at least one rotation motor, causing the motion platform to move to the required angle. For example, the first rotation motor 213 and the second rotation motor 223 as shown in FIG. 1B may be controlled, so that the motion platform rotates around the X-axis and/or the Y-axis at a certain angle.

According to some embodiments of the present disclosure, the current rotation angle and the target rotation angle of the motion platform may be obtained. Each of the current rotation angle and the target rotation angle may be the rotation angle of the motion platform rotating around at least one predetermined coordinate axis. The motor rotation angle for driving the motion platform may be obtained based on the current rotation angle and the target rotation angle. The at least one motor motion control parameter of the rotation motor may be determined based on the motor rotation angle. The rotation motor may be driven based on the at least one motor motion control parameter. The rotation motor may be used to control the rotation angle of the motion platform. The motor rotation angle can be determined by performing the reverse modeling based on the current rotation angle and the target rotation angle, the motor motion control parameter (s) of the rotation motor can be determined based on the motor rotation angle, and the rotation motor can be further driven based on the motor motion control parameter(s). In such way, control parameter(s) of the rotation motor can be obtained by performing the reverse modeling based on the required angle of the rotation of the motion platform, which can improve the accuracy of the rotation of the motion platform, thereby improving the accuracy of the motion control.

In some embodiments, the processor 610 may obtain at least one current angular location of the at least one rotation motor based on the current rotation angle, obtain at least one target angular location of the at least one rotation motor based on the target rotation angle, and obtain the at least one motor rotation angle based on the at least one current angular location and the at least one target angular location.

The current angular location may be a rotation angle at which the rotation motor is currently located, and the target angular location may be a rotation angle at which the rotation motor is required to be located after the rotation motor is driven and controlled.

For example, the current angular location of the rotation motor may be obtained based on the current rotation angle of the motion platform and a relationship function between rockers (e.g., the first rocker 211 and the second rocker 221) located between the motion platform and the rotation motor. Similarly, the target angular location of the rotation motor may be obtained based on the target rotation angle of the motion platform and the relationship function between the rockers located between the motion platform and the rotation motor. Merely by way of example, as shown in FIG. 1B, the motion platform has a certain rotation angle, and a coordinate of an upper end of the first rocker 211 may be determined, and a coordinate of a lower end of the first rocker 211 may be represented by a location of the first rotation motor 213. Based on a length value of the first rocker 211, a relationship function between the rotation angle of the motion platform and the location of the rotation motor (e.g., the first rotation motor 213) may be established.

According to some embodiments of the present disclosure, the angular location of the rotation motor can be obtained by performing the reverse modeling based on the rotation angle of the motion platform, which can improve the accuracy of the rotation of the motion platform, thereby improving the accuracy of the motion control.

In some embodiments, the rotation motor may include a first rotation motor and a second rotation motor (e.g., the first rotation motor 213 and the second rotation motor 223). Therefore, the obtaining the current angular location of the rotation motor based on the current rotation angle may be performed by process 900 as described in FIG. 9.

Figure 9:
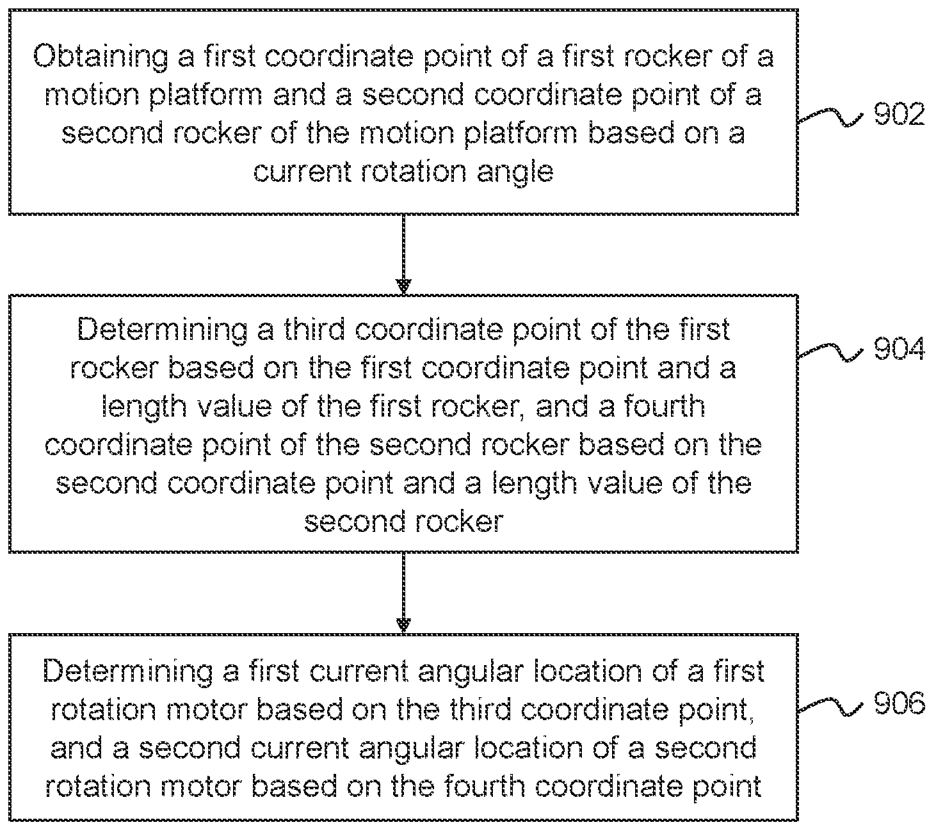
FIG. 9 is a flowchart illustrating an exemplary process for obtaining a current angular location of a rotation motor according to some embodiments of the present disclosure.

FIG. 9 is a flowchart illustrating an exemplary process 900 for obtaining a current angular location of a rotation motor according to some embodiments of the present disclosure.

In 902, the processor 610 (e.g., the rotation angle obtaining module 720) may obtain a first coordinate point of a first rocker of a motion platform and a second coordinate point of a second rocker of the motion platform based on a current rotation angle. The first rocker may be configured to connect the motion platform to the first rotation motor, and the second rocker may be configured to connect the motion platform to the second rotation motor.

In 904, the processor 610 (e.g., the rotation angle obtaining module 720) may determine a third coordinate point of the first rocker based on the first coordinate point and a length value of the first rocker, and a fourth coordinate point of the second rocker based on the second coordinate point and a length value of the second rocker.

In 906, the processor 610 (e.g., the rotation angle obtaining module 720) may determine a first current angular location of the first rotation motor based on the third coordinate point, and a second current angular location of the second rotation motor based on the fourth coordinate point.

For example, the first rocker may be the first rocker 211 configured to connect the motion platform to the first rotation motor 213, and the second rocker may be the second rocker 221 configured to connect the motion platform to the second rotation motor 223. The first coordinate point may be a coordinate point of an end of the first rocker 211 connecting to the motion platform. The second coordinate point may be a coordinate point of an end of the second rocker 221 connecting to the motion platform. The third coordinate point may be a coordinate point of an end of the first rocker 211 connecting to the rotation motor. The fourth coordinate point may be a coordinate point of an end of the second rocker 221 connecting to the rotation motor.

For example, as shown in FIG. 1B, the motion platform may rotate around the X-axis and/or around the Y-axis. Before a motion control is performed on the motion platform, the motion platform has a certain rotation angle, which is designated as the current rotation angle around the X-axis and/or around the Y-axis. When the current rotation angle of the motion platform is determined, a coordinate point (the first coordinate point) of the upper spherical center of the motion platform and the first rocker 211 may be determined, and a coordinate point (the third coordinate point) of the lower spherical center of the first rocker 211 may be determined based on the current angular location of the first rotation motor 213. A relationship of the current angular location of the first rotation motor 213 with respect to the current rotation angle may be established based on the length value of the first rocker 211 (which is a constant value), and the first current angular location of the first rotation motor 213 may be determined. Similarly, a target angular location of the first rotation motor 213 may be obtained based on the target rotation angle of the motion platform and a relationship between an angular location of the first rotation motor 213 and a rotation angle of the motion platform.

Similarly, when the current rotation angle of the motion platform is determined, a coordinate point (the second coordinate point) of the upper spherical center of the motion platform and the second rocker 221 may be determined, and a coordinate point (the fourth coordinate point) of the lower spherical center of the second rocker 221 may be determined based on the current angular location of the second rotation motor 223. A relationship of the current angular location of the second rotation motor 223 with respect to the current rotation angle may be established based on the length value of the second rocker 221 (which is a constant value), and the second current angular location of the second rotation motor 223 may be determined.

According to some embodiments of the present disclosure, the functional relationship between the rotation angle of the motion platform and the angular location of the rotation motor may be constructed based on the coordinate points of the rocker, and the angular location of the rotation motor may be obtained by determining the rotation angle of the rotation motor so as to obtain the motor rotation angle. In such way, through the reverse modeling, the rotation angle of the rotation motor that conforms to a real situation can be obtained, which can improve the accuracy of the motor motion control parameter(s), thereby improving the accuracy of the control of the motion platform.

In some embodiments, the processor 610 may determine at least one motor motion parameter of the at least one rotation motor based on the at least one motor rotation angle, obtain at least one control transformation parameter, and obtain the at least one motor motion control parameter of the at least one rotation motor by performing a parameter transformation on the at least one motor motion parameter based on the at least one control transformation parameter.

The at least one motor motion parameter may be parameter(s) defining the motion of the at least one rotation motor. The at least one control transformation parameter may be coded transformation parameter(s), for example, coded value(s).

For example, the parameter(s) defining the motion of the at least one rotation motor may be obtained based on the at least one motor rotation angle, and the at least one motor motion control parameter for controlling the motion of the at least one rotation motor may be obtained by transforming the at least one motor motion parameter based on the coded transformation parameter(s). That is, the coded value(s) for controlling the rotation motor may be obtained.

Merely by way of example, as shown in FIG. 1B, the motion control may be performed on the motion platform through the first rotation motor 213 and the second rotation motor 223. A first motor motion parameter of the first rotation motor 213 may be determined by obtaining a motor rotation angle of the first rotation motor 213, and a first motor motion control parameter of the first rotation motor 213 may be determined by performing the parameter transformation on the first motor motion parameter based on the at least one control transformation parameter. A second motor motion parameter of the second rotation motor 223 may be determined by obtaining a motor rotation angle of the second rotation motor 223, and a second motor motion control parameter of the second rotation motor 223 may be determined by performing the parameter transformation on the second motor motion parameter based on the at least one control transformation parameter.

According to some embodiments of the present disclosure, the motor motion control parameter(s) may be obtained by transforming the motor motion parameter(s). For example, the rotation motor can be controlled by coding, which can simplify the control of the rotation motor, thereby improving the efficiency of the rotation motor, and improving the efficiency of controlling the motion platform.

In some embodiments, the processor 610 may obtain an initial motor motion control parameter, obtain a corrected motor motion control parameter by correcting the motor motion control parameter based on the initial motor motion control parameter, and control the motion of the rotation motor based on the corrected motor motion control parameter.

The initial motor motion control parameter may be an initial control parameter of the rotation motor.

For example, in general, the initial motor motion control parameter may be zero. If the initial motor motion control parameter is not zero, the motor motion control parameter needs to be corrected. The corrected motor motion control parameter may be obtained based on a difference between the initial motor motion control parameter and the motor motion control parameter, and the motion of the rotation motor may be controlled based on the corrected motor motion control parameter.

Merely by way of example, as shown in FIG. 1B, the motion control may be performed on the motion platform through the first rotation motor 213 and the second rotation motor 223. A corrected first motor motion control parameter may be obtained based on a difference between a first initial motor motion control parameter and the first motor motion control parameter, and the motion of the first rotation motor 213 may be controlled based on the corrected first motor motion control parameter. Similarly, a corrected second motor motion control parameter may be obtained based on a difference between a second initial motor motion control parameter and the second motor motion control parameter, and the motion of the second rotation motor 223 may be controlled based on the corrected second motor motion control parameter.

According to some embodiments of the present disclosure, the motor motion control parameter(s) may be corrected based on the initial motor motion control parameter (s), which can improve the accuracy of controlling the rotation motor, thereby improving the accuracy of controlling the motion platform.

Figure 10:
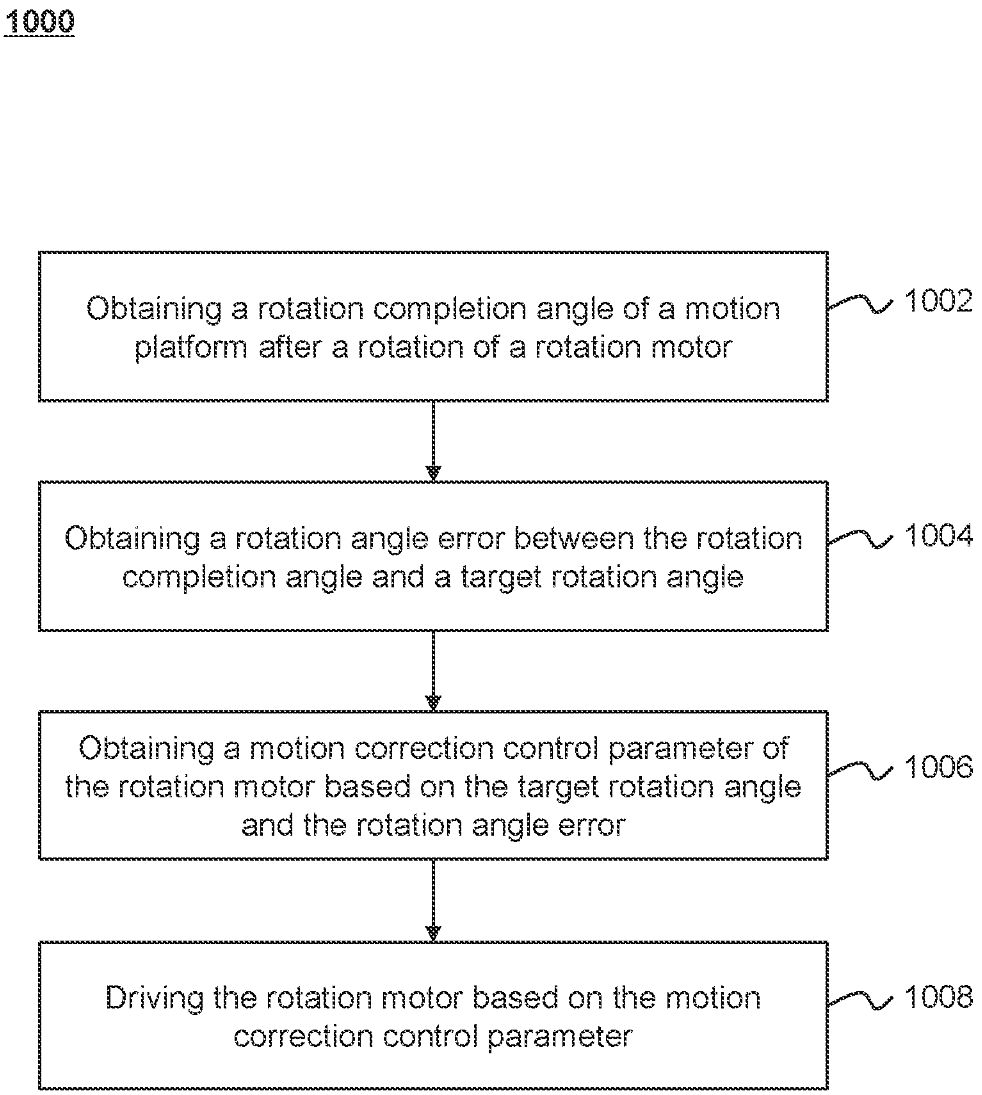
FIG. 10 is a flowchart illustrating an exemplary process for driving a rotation motor according to some embodiments of the present disclosure.

In some embodiments, after the rotation motor is driven based on the at least one motor motion control parameter, the rotation motor may be further controlled by process 1000 as described in FIG. 10.

FIG. 10 is a flowchart illustrating an exemplary process 1000 for driving a rotation motor according to some embodiments of the present disclosure.

In 1002, the processor 610 (e.g., the control module 740) may obtain a rotation completion angle of a motion platform after the rotation of the rotation motor.

In 1004, the processor 610 (e.g., the control module 740) may obtain a rotation angle error between the rotation completion angle and a target rotation angle.

In 1006, the processor 610 (e.g., the control module 740) may obtain a motion correction control parameter of the rotation motor based on the target rotation angle and the rotation angle error.

In 1008, the processor 610 (e.g., the control module 740) may drive the rotation motor based on the motion correction control parameter.

The rotation completion angle may be an angle formed between the motion platform and an X-axis and/or a Y-axis after the motion platform is rotated. The rotation angle error may be an error between an angle of the motion platform after the motion platform rotates around the X-axis and/or the Y-axis and a target rotation angle of the motion platform rotating around the X-axis and/or the Y-axis.

For example, after the motion platform is rotated, the rotation completion angle formed between the motion platform and the X-axis and/or the Y-axis may be obtained. The rotation angle error may be obtained according to the rotation completion angle and the target rotation angle. The motion correction control parameter of the rotation motor may be obtained by performing the reverse modeling using the target rotation angle and the rotation angle error.

According to some embodiments of the present disclosure, the rotation motor may be further driven according to the rotation angle error after the motion platform is moved, so as to move the motion platform to a target location, which can improve the accuracy of controlling the motion platform.

In some embodiments, the motion platform may include a first motion platform and a second motion platform. The first motion platform may be a platform that remains stationary during the rotation of the motion platform, and the second motion platform may be a platform that rotates during the rotation of the motion platform.

In some embodiments, the processor 610 may obtain a first coordinate system corresponding to the first motion platform and a second coordinate system corresponding to the second motion platform, obtain a target coordinate system by performing a coordinate transformation between the first coordinate system and the second coordinate system, and obtain the current rotation angle based on a distance between a predetermined point of the first motion platform and a predetermined point of the second motion platform in the target coordinate system.

As shown in FIG. 1B, the first motion platform may be a platform that is connected to one end of the first rocker 211 and one end of the second rocker 221, and the connection makes the first motion platform remain stationary. The second motion platform may be a platform that is connected to another end of the first rocker 211 and another end of the second rocker 221, and the connection drives the second motion platform to rotate. For example, the first motion platform may be the base plate 300, and the second motion platform may be the moveable plate 100. The first coordinate system may be a coordinate system where the first motion platform is located, and the second coordinate system may be a coordinate system where the second motion platform is located.

For example, a unified target coordinate system may be obtained by performing a coordinate system transformation on a coordinate system (e.g., the first coordinate system) where the first motion platform is located and a coordinate system (e.g., the second coordinate system) where the second motion platform is located. The predetermined point of the first motion platform may be a vertex of the one end of the first rocker 211, and the predetermined point of the second motion platform may be a vertex of the one end of the second rocker 221. The current rotation angle of the motion platform may be determined based on a distance between the vertex of the one end of the first rocker 211 and the vertex of the one end of the second rocker 221.

According to some embodiments of the present disclosure, by unifying the first coordinate system of the first motion platform and the second coordinate system of the second motion platform, the accuracy of the obtaining the current rotation angle may be improved, thereby improving the accuracy of controlling the motion platform.

In a specific embodiment, a process for controlling the motion platform as shown in FIG. 1B is provided. The process may include following operations.

A first current rotation angle $pitch_{init}$ and a second current rotation angle $roll_{init}$ of a motion platform may be obtained, and motor locations $X_{init}$ and $Y_{init}$ may be determined based on a look-up table or a fitting equation.

Values $countx_{init}$ and $county_{init}$ of encoders of the first rotation motor 213 and the second rotation motor 223 may be determined.

A first target rotation angle $pitch_{set}$ and a second target rotation angle $roll_{set}$ may be set, and target motor locations $X_{set}$ and $Y_{set}$ may be determined based on the look-up table or the fitting equation.

ΔX and ΔY may be determined based on a difference between $X_{set}$ and $X_{init}$ and a difference between $Y_{set}$ and $Y_{init}$, respectively.

Idealcountx and idealcounty may be determined by multiplying ΔX and ΔY by a theoretical coded value 12278, respectively.

Countx may be determined by subtracting the idealcountx from the $countx_{init}$, and county may be determined by subtracting the idealcounty from the $county_{init}$. The motion platform may be controlled to move by sending the countx and county to the first rotation motor 213 and the second rotation motor 223, respectively.

After the motion platform is moved, Δpitch and Δroll may be determined by subtracting actual angles $pitch_{act}$ and $roll_{act}$ after the motion of the motion platform from the target rotation angles $pitch_{set}$ and $roll_{set}$, respectively. That is, $\Delta pitch = pitch_{act} - pitch_{set}$ and $\Delta roll = roll_{act} - roll_{set}$.

Therefore, Δcountx and Δcounty may be determined based on $pitch_{set}$, Δpitch, $roll_{set}$, and Δroll. For example, an inverse equation may be determined based on a structure of the motion platform. A first equation corresponding to Δcountx may be generated by performing a first order partial derivation of Δcountx on the inverse equation, and a second equation corresponding to Δcounty may be generated by performing a first order partial derivation of Δcounty on the inverse equation. Correspondingly, Δcountx may be determined by inputting $pitch_{set}$, Δpitch, $roll_{set}$, and Δroll into the first equation, and Δcounty may be determined by inputting $pitch_{set}$, Δpitch, $roll_{set}$, and Δroll into the second equation.

The first rotation motor 213 and the second rotation motor 223 may be driven based on the Δcountx and Δcounty, respectively, so as to direct the motion platform to move to the target rotation angle.

Figure 11:
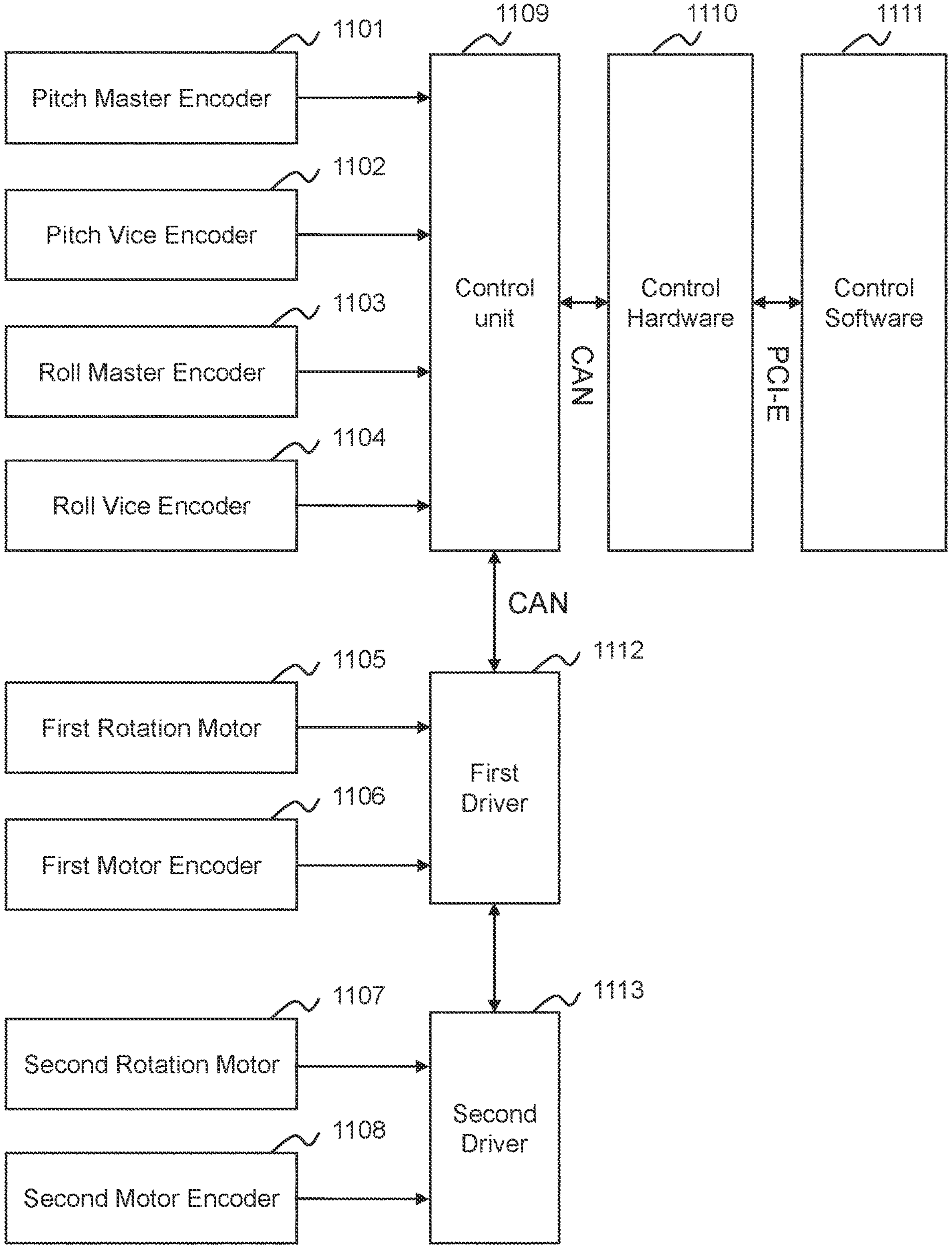
FIG. 11 is a block diagram illustrating an exemplary electrical control structure of a motion platform according to some embodiments of the present disclosure.

FIG. 11 is a block diagram illustrating an exemplary electrical control structure of a motion platform according to some embodiments of the present disclosure.

As shown in FIG. 11, a control software 1111 may communicate with a control hardware 1110 via a peripheral component interconnect express (PCI-E). The control hardware 1110 may include a controller area network (CAN) chip. The control hardware 1110 may be a control master in a control network, and connect to a control unit 1109 via a CAN bus. The control unit 1109 may obtain coded information 1104 of a pitch master encoder 1101, a pitch vice encoder 1102, a roll master encoder 1103, and a roll vice encoder 1104, respectively. The control unit 1109 may be connected to a first driver 1112 via the CAN bus, and the first drive 1112 may be connected to a second driver 1113 via the CAN bus. The first driver 1112 may drive a first rotation motor 1105 and obtain coded information from a first motor encoder 1106. The second driver 1113 may drive a second rotation motor 1107 and obtain coded information from a second motor encoder 1108.

A pitch rotation angle and a roll rotation angle of the motion platform may be driven by a joint action of the two rotation motors. A separate motion (the pitch rotation angle or the roll rotation angle of the motion platform) needs the two rotation motors to work together. Both the pitch rotation angle and the roll rotation angle may change when a single rotation motor is operating. Angles of the first rotation motor 1105 and the second rotation motor 1107 may be determined based on target rotation angle(s) (set angles of the pitch rotation angle or the roll rotation angle).

In operation 1, the angles corresponding to the first rotation motor 1105 and the second rotation motor 1107 may be determined using the inverse kinematics based on the set angles of the pitch rotation angle or the roll rotation angle, and the first rotation motor 1105 and the second rotation motor 1107 may be operated simultaneously based on the angles.

In operation 2, current angles corresponding to the first rotation motor 1105 and the second rotation motor 1107 may be obtained through pitch and roll sensors. The current angles may be reported through the CAN bus. The control software 1111 may determine an angle error between the angle and the current angle corresponding to the first rotation motor 1105 and an angle error between the angle and the current angle corresponding to the second rotation motor 1107. Compensation angle values of the first rotation motor 1105 and the second rotation motor 1107 may be determined based on the two angle errors using a control algorithm, and then the two rotation motors may be operated simultaneously according to the compensation angle values. During the whole process, the system may be in servo state. That is, a deviation of the angles may be corrected in real time.

The control process may be adaptive to compensate for each machining and installation error. Most of the equation solving and derivation have been completed offline, and polynomials may be obtained by fitting solved data, which reduces a computation time of a lower computer. The polynomials can be used directly during the control process.

The possible beneficial effects of the embodiments of the present disclosure may include but not be limited to the following. (1) The motion platform can include a moveable plate, a base plate, a fulcrum mechanism, and at least two driving mechanisms. The fulcrum mechanism and the driving mechanism can be disposed on the base plate. A bottom surface of the moveable plate can include at least three non-collinear support points. Each of the fulcrum mechanism and the at least two driving mechanisms may be disposed at one of the support points and connected with the moveable plate. When one driving mechanism independently drives a corresponding support point to move along a vertical direction, the moveable plate can be tilted, and the fulcrum mechanism can provide the moveable plate with a rotational degree of freedom along a tilted direction of the moveable plate. (2) The motion platform can realize two rotational degrees of freedom. In addition, the first rotation unit can include a first rotation shaft and a first bearing seat. The first bearing seat can be configured to connect the first rotation shaft to the base plate. The second rotation unit can include a second rotation shaft and a second bearing seat. The second bearing seat can be configured to connect the second rotation shaft to the moveable plate. The fulcrum mechanism can further include a fixed seat. The first rotation shaft and the second rotation shaft can be disposed on the fixed seat, and an axis of the first rotation shaft can intersect with an axis of the second rotation shaft. Due to a limited operation of the rotation of the first rotation shaft or the second rotating shaft, the rotation of the moveable plate along other directions can be prevented, which can further improve the rotation accuracy of the moveable plate. (3) The motion platform can include an encoder. A rotation angle of the first rotation shaft and/or the second rotation shaft can be fed back through the encoder, so as to determine a tilt angle of the moveable plate, and further adjust the tilt angle of the moveable plate in time based on demand, thereby improving the motion accuracy of the motion platform. It should be noted that different embodiments may have different beneficial effects. In different embodiments, the possible beneficial effects may be any one of the above effects, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A motion platform, comprising:

a moveable plate;

a first driving mechanism;

a second driving mechanism; and a fulcrum mechanism; wherein the first driving mechanism and the second driving mechanism are connected to the moveable plate at a first support point and a second support point, respectively, and the fulcrum mechanism is connected to the moveable plate at a third support point;

the first support point, the second support point, and the third support point are non-collinear;

the first driving mechanism and the second driving mechanism are configured to cause the moveable plate to move in at least two degrees of freedom relative to the third support point; and at least one of the first driving mechanism or the second driving mechanism includes a rotation driving unit and a power conversion unit, the power conversion unit being configured to convert a rotational motion of the rotation driving unit into a movement of a corresponding support point.

2. The motion platform of claim 1, wherein the rotation driving unit includes a rotation motor, and the power conversion unit includes a rocker, wherein an end of the rocker is rotationally connected to an output end of the rotation motor, and another end of the rocker is rotationally connected to the moveable plate.

3. The motion platform of claim 2, wherein the power conversion unit further includes a reducer, the reducer being disposed at the output end of the rotation motor, and the rocker being connected to the output end of the rotation motor through the reducer.

4. The motion platform of claim 2, wherein both ends of the rocker are disposed with joint bearings, the both ends of the rocker being rotationally connected to the output end of the rotation motor and the moveable plate through the corresponding joint bearings, respectively.

5. The motion platform claim 1, wherein the first driving mechanism and/or the second driving mechanism include linear driving units.

6. The motion platform of claim 1, wherein the fulcrum mechanism includes a first rotation unit and a second rotation unit, an angle between a rotation shaft of the first rotation unit and a rotation shaft of the second rotation unit being within a range of 85 degrees to 90 degrees.

7. The motion platform of claim 6, wherein a relative position between the rotation shaft of the first rotation unit and the rotation shaft of the second rotation unit remains.

8. The motion platform of claim 6, wherein the motion platform further includes a base plate, the first driving mechanism, the second driving mechanism, and the fulcrum mechanism being disposed on the base plate; and the first rotation unit is connected to the base plate, the second rotation unit is connected to the moveable plate, and the moveable plate rotates relative to the base plate through the first rotation unit and/or the second rotation unit.

9. The motion platform of claim 8, wherein the first rotation unit includes a first rotation shaft and a first bearing seat, the first bearing seat being configured to connect the first rotation shaft to the base plate;

the second rotation unit includes a second rotation shaft and a second bearing seat, the second bearing seat being configured to connect the second rotation shaft to the moveable plate; and the fulcrum mechanism includes a fixed seat, the first rotation shaft and the second rotation shaft being disposed on the fixed seat, and an axis of the first rotation shaft intersecting with an axis of the second rotation shaft.

10. The motion platform of claim 8, wherein the first rotation unit includes a first rotation shaft and a first bearing seat, the first bearing seat being configured to connect the first rotation shaft to the base plate;

the second rotation unit includes a second rotation shaft and a second bearing seat, the second bearing seat being configured to connect the second rotation shaft to the moveable plate; and the first rotation shaft and the second rotation shaft form an integral cross rotation shaft part.

11. The motion platform of claim 9, wherein the second bearing seat is connected to the moveable plate through a connecting plate; and the third support point is a center point of a contact surface between the connecting plate and the moveable plate.

12. The motion platform of claim 6, wherein an encoder is disposed on the rotation shaft of the first rotation unit and/or the rotation shaft of the second rotation unit, the encoder being configured to detect a rotation angle of a corresponding rotation shaft.

13. The motion platform of claim 6, wherein the fulcrum mechanism includes a third rotation unit, an angle between a rotation shaft of the third rotation unit and the rotation shaft of the first rotation unit being within a range of 85 degrees to 90 degrees, and an angle between the rotation shaft of the third rotation unit and the rotation shaft of the second rotation unit being within a range of 85 degrees to 90 degrees.

14. The motion platform of claim 13, further comprising a third driving mechanism configured to cause the moveable plate to move relative to the rotation shaft of the third rotation unit.

15. A medical bed, comprising:

a motion platform; and a bed plate; wherein the moveable plate of the motion platform is configured to fix and support the bed plate so as to drive the bed plate to move, the motion platform includes a moveable plate, a first driving mechanism, a second driving mechanism, and a fulcrum mechanism, the first driving mechanism and the second driving mechanism are connected to the moveable plate at a first support point and a second support point, respectively, and the fulcrum mechanism is connected to the moveable plate at a third support point;

the first support point, the second support point, and the third support point are non-collinear;

the first driving mechanism and the second driving mechanism are configured to cause the moveable plate to move in at least two degrees of freedom relative to the third support point; and at least one of the first driving mechanism or the second driving mechanism includes a rotation driving unit and a power conversion unit, the power conversion unit being configured to convert a rotational motion of the rotation driving unit into a movement of a corresponding support point.

16. A medical device, comprising:

a medical bed including a motion platform and a bed plate, the motion platform including a moveable plate, a first driving mechanism, a second driving mechanism, and a fulcrum mechanism, wherein the first driving mechanism and the second driving mechanism are connected to the moveable plate at a first support point and a second support point, respectively, and the fulcrum mechanism is connected to the moveable plate at a third support point;

the first support point, the second support point, and the third support point are non-collinear;

the first driving mechanism and the second driving mechanism are configured to cause the moveable plate to move in at least two degrees of freedom relative to the third support point;

the moveable plate of the motion platform is configured to fix and support the bed plate so as to drive the bed plate to move; and at least one of the first driving mechanism or the second driving mechanism includes a rotation driving unit and a power conversion unit, the power conversion unit being configured to convert a rotational motion of the rotation driving unit into a movement of a corresponding support point.

17. The medical device of claim 16, further comprising:

a processor configured to obtain a current rotation angle and a target rotation angle of the motion platform;

obtain at least one motor rotation angle for driving the motion platform based on the current rotation angle and the target rotation angle, the motion platform including at least one rotation motor;

determine at least one motor motion control parameter of the at least one rotation motor based on the motor rotation angle; and drive the at least one rotation motor based on the at least one motor motion control parameter.

18. The medical device of claim 17, wherein to obtain the at least one motor rotation angle for driving the motion platform based on the current rotation angle and the target rotation angle, the processor is configured to:

obtain at least one current angular location of the at least one rotation motor based on the current rotation angle;

obtain at least one target angular location of the at least one rotation motor based on the target rotation angle; and obtain the at least one motor rotation angle based on the at least one current angular location and the at least one target angular location.

19. The medical device of claim 17, wherein to determine the at least one motor motion control parameter of the at least one rotation motor based on the at least one motor rotation angle, the processor is configured to:

determine the at least one motor motion parameter of the at least one rotation motor based on the at least one motor rotation angle;

obtain at least one control transformation parameter; and obtain the at least one motor motion control parameter of the at least one rotation motor by performing a parameter transformation on the at least one motor motion parameter based on the at least one control transformation parameter.

* * * * *